United States Patent
Nayak et al.

(10) Patent No.: US 11,922,343 B2
(45) Date of Patent: Mar. 5, 2024

(54) SYSTEMS AND METHODS FOR COMBINATORIAL RESOURCE OPTIMIZATION

(71) Applicant: Walmart Apollo, LLC, Bentonville, AR (US)

(72) Inventors: Amritayan Nayak, Santa Clara, CA (US); Prakash Seetharaman, Santa Clara, CA (US); Mingang Fu, Palo Alto, CA (US); Pushkar Raj Pande, Sunnyvale, CA (US); Deepak Deshpande, San Jose, CA (US); Kumar Malyala, Pleasanton, CA (US); Rohit Jain, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/099,591

(22) Filed: Jan. 20, 2023

(65) Prior Publication Data
US 2023/0169415 A1    Jun. 1, 2023

Related U.S. Application Data

(63) Continuation of application No. 16/007,913, filed on Jun. 13, 2018, now abandoned, which is a
(Continued)

(51) Int. Cl.
*G06Q 10/047* (2023.01)
*G06F 9/54* (2006.01)
(Continued)

(52) U.S. Cl.
CPC .......... *G06Q 10/047* (2013.01); *G06F 9/546* (2013.01); *G06F 16/128* (2019.01); *G06F 16/23* (2019.01); *G06Q 10/083* (2013.01)

(58) Field of Classification Search
CPC .......... G06Q 30/0264; G06Q 10/047; G06Q 10/06312; G06Q 10/063116; G06Q 10/083; G05B 2219/34418
(Continued)

(56) References Cited

U.S. PATENT DOCUMENTS 5,444,444 A    8/1995  Ross
5,922,040 A    7/1999  Prabhakaran
(Continued)

FOREIGN PATENT DOCUMENTS

CN    111144822 A         5/2020
JP    2002183264 A   *    6/2002
(Continued)

OTHER PUBLICATIONS

"Time Slot Management in Attended Home Delivery," by Niels Agatz, Ann Campbell, Mortiz Fleischmann, and Martin Savelsbergh, Apr. 15, 2008 (Year: 2008).*
(Continued)

*Primary Examiner* — Omar Zeroual
*Assistant Examiner* — Brian Adams Heflin
(74) *Attorney, Agent, or Firm* — Morgan, Lewis & Bockius LLP; Manita Rawat

(57) ABSTRACT

Horizontally-scalable systems and methods for scheduling and optimizing deliveries are described herein. At least one scheduler is configured to receive a request to schedule a delivery for an origination location. The request includes a desired time slot. The request is compared to a persistent delivery snapshot for the origination location to determine availability of the desired time slot. An interim delivery snapshot including the requested delivery is generated when the persistent delivery snapshot has an available time slot corresponding to the desired time slot. At least one optimizer is configured to receive the interim delivery snapshot and
(Continued)

generate an updated persistent delivery snapshot by applying an optimization process to the interim delivery snapshot.

17 Claims, 11 Drawing Sheets

Related U.S. Application Data continuation-in-part of application No. 15/876,007, filed on Jan. 19, 2018, now Pat. No. 11,475,395.

(51) Int. Cl.
  *G06F 16/11* (2019.01)
  *G06F 16/23* (2019.01)
  *G06Q 10/083* (2023.01)

(58) Field of Classification Search
  USPC .......................................................... 705/338
  See application file for complete search history.

(56) References Cited

U.S. PATENT DOCUMENTS

| | | | |
|---|---|---|---|
| 6,240,362 | B1 | 5/2001 | Gaspard, II |
| 6,701,299 | B2 | 3/2004 | Kraisser et al. |
| 6,754,634 | B1* | 6/2004 | Ho .................. G06Q 10/02 |
| | | | 705/5 |
| 6,963,861 | B1 | 11/2005 | Boucher et al. |
| 7,222,081 | B1 | 5/2007 | Sone |
| 7,251,612 | B1 | 7/2007 | Parker et al. |
| 7,430,517 | B1 | 9/2008 | Barton |
| 7,437,305 | B1* | 10/2008 | Kantarjiev ......... G06Q 30/0201 |
| | | | 705/7.29 |
| 7,775,431 | B2 | 8/2010 | Skaaksrud et al. |
| 8,015,023 | B1 | 9/2011 | Lee et al. |
| 8,126,903 | B2 | 2/2012 | Lehmann et al. |
| 8,160,972 | B1 | 4/2012 | Tannenbaum |
| 8,224,707 | B1 | 7/2012 | Smith et al. |
| 8,429,019 | B1 | 4/2013 | Yeatts et al. |
| 8,438,088 | B2 | 5/2013 | Cunniff et al. |
| 8,521,656 | B2 | 8/2013 | Zimberoff et al. |
| 9,037,406 | B2* | 5/2015 | Mason ................. G06Q 10/047 |
| | | | 701/482 |
| 9,256,852 | B1 | 2/2016 | Myllymaki |
| 9,494,937 | B2 | 11/2016 | Siegel et al. |
| 9,619,775 | B1 | 4/2017 | Saito |
| 9,626,639 | B2 | 4/2017 | Gibbon et al. |
| 9,691,091 | B2 | 6/2017 | Jones et al. |
| 9,857,188 | B1 | 1/2018 | O'Hare et al. |
| 10,157,362 | B1 | 12/2018 | Johansson et al. |
| 10,163,070 | B1 | 12/2018 | Phillips et al. |
| 10,204,528 | B2 | 2/2019 | Truong et al. |
| 10,227,178 | B2 | 3/2019 | High et al. |
| 10,233,021 | B1 | 3/2019 | Brady et al. |
| 10,245,993 | B1 | 4/2019 | Brady et al. |
| 10,248,731 | B1 | 4/2019 | Brouwer, II et al. |
| 10,255,577 | B1 | 4/2019 | Steves et al. |
| 10,304,027 | B1 | 5/2019 | Haque |
| 10,514,690 | B1 | 12/2019 | Siegel et al. |
| 10,627,244 | B1 | 4/2020 | Lauka et al. |
| 10,839,695 | B2 | 11/2020 | Kuncl et al. |
| 10,846,633 | B2 | 11/2020 | Magazinik et al. |
| 11,157,866 | B2* | 10/2021 | Bostick ............. G06Q 10/08355 |
| 11,615,368 | B2* | 3/2023 | Fu ...................... G06Q 10/0833 |
| | | | 705/333 |
| 2001/0047285 | A1 | 11/2001 | Borders et al. |
| 2001/0056395 | A1 | 12/2001 | Khan |
| 2002/0007299 | A1* | 1/2002 | Florence .......... G06Q 10/08355 |
| | | | 705/7.12 |
| 2002/0052688 | A1 | 5/2002 | Yofu |
| 2002/0073049 | A1 | 6/2002 | Dutta |
| 2002/0107820 | A1 | 8/2002 | Huxter |
| 2002/0147654 | A1* | 10/2002 | Kraisser ................. G06Q 10/08 |
| | | | 705/330 |
| 2002/0152174 | A1 | 10/2002 | Woods et al. |
| 2002/0188517 | A1 | 12/2002 | Banerjee et al. |
| 2003/0040944 | A1 | 2/2003 | Hileman |
| 2003/0078873 | A1 | 4/2003 | Cohen |
| 2003/0084125 | A1 | 5/2003 | Nagda et al. |
| 2003/0200111 | A1 | 10/2003 | Damji |
| 2003/0236679 | A1 | 12/2003 | Galves et al. |
| 2004/0015393 | A1 | 1/2004 | Fong et al. |
| 2004/0030572 | A1 | 2/2004 | Campbell et al. |
| 2004/0030604 | A1* | 2/2004 | Young .................... G06Q 30/02 |
| | | | 705/307 |
| 2004/0034571 | A1 | 2/2004 | Wood et al. |
| 2004/0093302 | A1 | 5/2004 | Baker et al. |
| 2004/0107110 | A1* | 6/2004 | Gottlieb ............. G06Q 30/0283 |
| | | | 705/400 |
| 2004/0199285 | A1 | 10/2004 | Berichon et al. |
| 2005/0006470 | A1 | 1/2005 | Mrozik et al. |
| 2005/0209913 | A1 | 9/2005 | Wied et al. |
| 2005/0216364 | A1 | 9/2005 | Jurisic et al. |
| 2005/0228705 | A1 | 10/2005 | Irwin |
| 2005/0251330 | A1 | 11/2005 | Waterhouse et al. |
| 2005/0278063 | A1 | 12/2005 | Hersh et al. |
| 2006/0026030 | A1 | 2/2006 | Jacobs |
| 2006/0085318 | A1 | 4/2006 | Cohoon |
| 2006/0155595 | A1 | 7/2006 | Johannsen |
| 2006/0161335 | A1 | 7/2006 | Beinhaker |
| 2006/0235739 | A1 | 10/2006 | Levis et al. |
| 2006/0238334 | A1 | 10/2006 | Mangan et al. |
| 2006/0276960 | A1 | 12/2006 | Adamczyk et al. |
| 2007/0015518 | A1 | 1/2007 | Winter et al. |
| 2007/0038506 | A1 | 2/2007 | Noble et al. |
| 2007/0038673 | A1 | 2/2007 | Broussard et al. |
| 2007/0050279 | A1 | 3/2007 | Huang et al. |
| 2007/0083410 | A1 | 4/2007 | Hanna |
| 2007/0112647 | A1 | 5/2007 | Borders et al. |
| 2007/0185778 | A1 | 8/2007 | Weng |
| 2007/0257774 | A1 | 11/2007 | Stumpert et al. |
| 2008/0027737 | A1 | 1/2008 | Watkins |
| 2008/0082257 | A1 | 4/2008 | Lee |
| 2008/0109246 | A1 | 5/2008 | Russell |
| 2008/0235147 | A1 | 9/2008 | Jensen |
| 2008/0288368 | A1 | 11/2008 | Marks et al. |
| 2009/0005963 | A1 | 1/2009 | Jarvinen |
| 2009/0037095 | A1 | 2/2009 | Jani et al. |
| 2009/0058646 | A1 | 3/2009 | Waterhouse et al. |
| 2009/0070236 | A1 | 3/2009 | Cohen et al. |
| 2009/0099972 | A1 | 4/2009 | Angert et al. |
| 2009/0201201 | A1 | 8/2009 | Foster |
| 2009/0254405 | A1* | 10/2009 | Hollis .............. G06Q 10/06315 |
| | | | 705/7.25 |
| 2009/0296990 | A1 | 12/2009 | Holland et al. |
| 2010/0057341 | A1 | 3/2010 | Bradburn et al. |
| 2010/0222908 | A1 | 9/2010 | Gombert et al. |
| 2010/0234990 | A1 | 9/2010 | Zini et al. |
| 2010/0235210 | A1 | 9/2010 | Nadrotowicz, Jr. |
| 2010/0332284 | A1 | 12/2010 | Hilbush et al. |
| 2011/0054979 | A1 | 3/2011 | Cova et al. |
| 2011/0055046 | A1 | 3/2011 | Bowen et al. |
| 2011/0099040 | A1 | 4/2011 | Felt et al. |
| 2011/0112761 | A1 | 5/2011 | Hurley et al. |
| 2011/0119159 | A1 | 5/2011 | Chou et al. |
| 2011/0161964 | A1 | 6/2011 | Piazza et al. |
| 2011/0192893 | A1 | 8/2011 | Waugh et al. |
| 2011/0258134 | A1 | 10/2011 | Mendez |
| 2012/0078743 | A1 | 3/2012 | Betancourt |
| 2012/0173448 | A1 | 7/2012 | Rademaker |
| 2012/0174002 | A1 | 7/2012 | Martin et al. |
| 2012/0253892 | A1 | 10/2012 | Davidson |
| 2013/0024390 | A1 | 1/2013 | Zlobinsky |
| 2013/0117193 | A1 | 5/2013 | Ni |
| 2013/0144763 | A1 | 6/2013 | Skyberg et al. |
| 2013/0198042 | A1 | 8/2013 | Seifen |
| 2013/0238462 | A1 | 9/2013 | Lutnick |
| 2013/0246301 | A1 | 9/2013 | Radhakrishnan et al. |
| 2013/0268454 | A1 | 10/2013 | Mateer |
| 2013/0325553 | A1 | 12/2013 | Nadiadi et al. |
| 2013/0325741 | A1 | 12/2013 | Smalling et al. |
| 2013/0338855 | A1 | 12/2013 | Mason et al. |
| 2014/0012772 | A1 | 1/2014 | Pretorius |

(56) References Cited

U.S. PATENT DOCUMENTS

| | | |
|---|---|---|
| 2014/0023264 A1 | 1/2014 | Branch et al. |
| 2014/0032440 A1 | 1/2014 | Chandrashekar et al. |
| 2014/0040043 A1 | 2/2014 | Barron et al. |
| 2014/0046585 A1 | 2/2014 | Marris, IV et al. |
| 2014/0075572 A1 | 3/2014 | Mehring et al. |
| 2014/0081445 A1 | 3/2014 | Villamar |
| 2014/0095350 A1 | 4/2014 | Carr et al. |
| 2014/0149269 A1 | 5/2014 | Kantarjiev et al. |
| 2014/0164167 A1 | 6/2014 | Taylor |
| 2014/0172739 A1 | 6/2014 | Anderson et al. |
| 2014/0180914 A1 | 6/2014 | Abhyanker |
| 2014/0188750 A1 | 7/2014 | Seiler |
| 2014/0195421 A1 | 7/2014 | Lozito |
| 2014/0214715 A1* | 7/2014 | Crocker .............. G06Q 10/047 705/333 |
| 2014/0244110 A1 | 8/2014 | Tharaldson et al. |
| 2014/0258167 A1 | 9/2014 | Rohmann et al. |
| 2014/0277900 A1 | 9/2014 | Abhyanker |
| 2014/0279646 A1 | 9/2014 | Bodenhamer et al. |
| 2014/0317005 A1 | 10/2014 | Balwani |
| 2014/0330739 A1* | 11/2014 | Falcone .......... G06Q 10/08355 705/338 |
| 2014/0330741 A1 | 11/2014 | Bialynicka-Birula et al. |
| 2015/0039362 A1 | 2/2015 | Haque |
| 2015/0046362 A1 | 2/2015 | Muetzel et al. |
| 2015/0081360 A1 | 3/2015 | Sun et al. |
| 2015/0081581 A1 | 3/2015 | Gishen |
| 2015/0088620 A1 | 3/2015 | Wittek |
| 2015/0100514 A1 | 4/2015 | Parris |
| 2015/0120600 A1* | 4/2015 | Luwang .......... G06Q 10/08355 705/338 |
| 2015/0142591 A1 | 5/2015 | High et al. |
| 2015/0149298 A1 | 5/2015 | Tapley |
| 2015/0178678 A1 | 6/2015 | Carr et al. |
| 2015/0178778 A1 | 6/2015 | Lee et al. |
| 2015/0186869 A1 | 7/2015 | Winters et al. |
| 2015/0202770 A1 | 7/2015 | Patron et al. |
| 2015/0206267 A1 | 7/2015 | Khanna et al. |
| 2015/0219467 A1 | 8/2015 | Ingerman et al. |
| 2015/0294261 A1 | 10/2015 | Adell |
| 2015/0294262 A1 | 10/2015 | Nelson et al. |
| 2015/0310388 A1 | 10/2015 | Jamthe |
| 2015/0348282 A1 | 12/2015 | Gibbon et al. |
| 2016/0012392 A1 | 1/2016 | Paden et al. |
| 2016/0019501 A1 | 1/2016 | Olechko et al. |
| 2016/0037481 A1 | 2/2016 | Won et al. |
| 2016/0042319 A1 | 2/2016 | Mauch |
| 2016/0042321 A1 | 2/2016 | Held |
| 2016/0048804 A1 | 2/2016 | Paul et al. |
| 2016/0063435 A1 | 3/2016 | Shah et al. |
| 2016/0071056 A1* | 3/2016 | Ellison ............ G06Q 10/08355 705/338 |
| 2016/0104112 A1 | 4/2016 | Gorlin |
| 2016/0125356 A1 | 5/2016 | Kellogg |
| 2016/0148303 A1 | 5/2016 | Carr et al. |
| 2016/0171439 A1 | 6/2016 | Ladden et al. |
| 2016/0210591 A1 | 7/2016 | Lafrance |
| 2016/0224935 A1 | 8/2016 | Burnett |
| 2016/0232487 A1 | 8/2016 | Yonker |
| 2016/0239788 A1 | 8/2016 | Hanks |
| 2016/0300185 A1 | 10/2016 | Zamer et al. |
| 2016/0328669 A1 | 11/2016 | Droege |
| 2016/0364678 A1 | 12/2016 | Cao |
| 2016/0379167 A1 | 12/2016 | Raman |
| 2017/0011180 A1 | 1/2017 | Andrews et al. |
| 2017/0011340 A1 | 1/2017 | Gabbai |
| 2017/0059337 A1 | 3/2017 | Barker et al. |
| 2017/0076058 A1 | 3/2017 | Stong |
| 2017/0083862 A1 | 3/2017 | Loubriel |
| 2017/0090484 A1 | 3/2017 | Obaidi |
| 2017/0091709 A1 | 3/2017 | Mishra et al. |
| 2017/0091856 A1 | 3/2017 | Canberk et al. |
| 2017/0127215 A1 | 5/2017 | Khan |
| 2017/0138749 A1 | 5/2017 | Pan et al. |
| 2017/0154347 A1 | 6/2017 | Bateman |
| 2017/0178057 A1 | 6/2017 | Al Rifai |
| 2017/0178070 A1* | 6/2017 | Wang ................ G06Q 10/0832 |
| 2017/0193404 A1 | 7/2017 | Yoo et al. |
| 2017/0193574 A1 | 7/2017 | Marueli |
| 2017/0200115 A1* | 7/2017 | High ................ G02B 27/017 |
| 2017/0213062 A1 | 7/2017 | Jones et al. |
| 2017/0228683 A1 | 8/2017 | Hu et al. |
| 2017/0262790 A1 | 9/2017 | Khasis |
| 2017/0300905 A1 | 10/2017 | Withrow et al. |
| 2017/0323250 A1 | 11/2017 | Lindbo et al. |
| 2017/0365030 A1 | 12/2017 | Shoham et al. |
| 2018/0018868 A1 | 1/2018 | Ren et al. |
| 2018/0060814 A1 | 3/2018 | Seaman et al. |
| 2018/0096287 A1 | 4/2018 | Senger |
| 2018/0107967 A1 | 4/2018 | Bulcao et al. |
| 2018/0107979 A1 | 4/2018 | Westover et al. |
| 2018/0130017 A1 | 5/2018 | Gupte |
| 2018/0158020 A1 | 6/2018 | Khasis |
| 2018/0283890 A1 | 10/2018 | Zhao et al. |
| 2018/0285806 A1 | 10/2018 | Scofield et al. |
| 2018/0299895 A1 | 10/2018 | Knotts et al. |
| 2018/0315319 A1 | 11/2018 | Spector et al. |
| 2018/0350214 A1 | 12/2018 | Roth et al. |
| 2018/0351671 A1 | 12/2018 | Sadeghi et al. |
| 2018/0356823 A1 | 12/2018 | Cooper |
| 2018/0365643 A1 | 12/2018 | Zhu et al. |
| 2019/0066047 A1 | 2/2019 | O'Brien et al. |
| 2019/0101401 A1 | 4/2019 | Balva |
| 2019/0114588 A1 | 4/2019 | Radetzki et al. |
| 2019/0156253 A1 | 5/2019 | Malyack et al. |
| 2019/0156283 A1 | 5/2019 | Abebe et al. |
| 2019/0164126 A1 | 5/2019 | Chopra et al. |
| 2019/0180229 A1 | 6/2019 | Phillips et al. |
| 2019/0197475 A1 | 6/2019 | Bianconcini et al. |
| 2019/0205857 A1 | 7/2019 | Bell et al. |
| 2019/0220785 A1* | 7/2019 | Tanno ................ G06Q 10/083 |
| 2019/0220816 A1 | 7/2019 | Frye |
| 2019/0266557 A1 | 8/2019 | Berk et al. |
| 2019/0266690 A1 | 8/2019 | Mandeno et al. |
| 2019/0285426 A1 | 9/2019 | Mitchell et al. |
| 2019/0333130 A1 | 10/2019 | Jha et al. |
| 2019/0385121 A1 | 12/2019 | Waliany et al. |
| 2020/0097900 A1 | 3/2020 | Kibbey et al. |
| 2020/0097908 A1 | 3/2020 | Glasfurd et al. |
| 2020/0104962 A1 | 4/2020 | Aich et al. |
| 2020/0116508 A1 | 4/2020 | Dashti et al. |
| 2020/0117683 A1 | 4/2020 | Ji et al. |
| 2020/0118071 A1 | 4/2020 | Venkatesan et al. |
| 2020/0134014 A1 | 4/2020 | Tiwari et al. |
| 2020/0134557 A1 | 4/2020 | Pevzner et al. |
| 2020/0160148 A1 | 5/2020 | Garg et al. |
| 2020/0210960 A1 | 7/2020 | Soryal et al. |
| 2020/0249040 A1 | 8/2020 | Yamaguchi |
| 2020/0265383 A1 | 8/2020 | Zhang |
| 2021/0150467 A1 | 5/2021 | Sakai et al. |
| 2021/0293550 A1 | 9/2021 | Migita |
| 2022/0067657 A1 | 3/2022 | Neumann |

FOREIGN PATENT DOCUMENTS

| | | | |
|---|---|---|---|
| JP | 2007017192 A | 1/2007 | |
| WO | 0169488 A1 | 9/2001 | |
| WO | WO-0169488 A1 * | 9/2001 | .......... G06Q 10/047 |
| WO | 2017062492 A1 | 4/2017 | |

OTHER PUBLICATIONS

"Solving multi depot vehicle routing problem for Iowa recycled paper by Tabu Search heuristic," by Supachai Pathumnakul, 1996 (Year: 1996).*

Supachai Pathumnakul, "Solving multi-depot vehicle routing problem for Iowa recycled paper by Tabu Search heuristic," A thesis submitted to the graduate faculty in partial fulfillment requirements for the degree of Master of Science, Iowa State University, (1996), 96 pages.

N. Agatz et al., "Time Slot Management in Attended Home Delivery," Apr. 15, 2008, 32 pages.

(56) References Cited

OTHER PUBLICATIONS

"Coincide," Merriam-Webster, Nov. 2, 2016.
D. E. Akyol, et al., "Determining time windows in urban freight transport: A city cooperative approach," Transportation Research Part E, 118, Jul. 12, 2018, pp. 34-50.
G. P. Rajappa, "Solving Combinatorial Optimization Problems Using Genetic Algorithms and Ant Colony Optimization," University of Tennessee, Tennessee Research and Creative Exchange, Doctoral Dissertations, Aug. 2012, 105 pages.
S. Pathumnakul, "Solving multi depot vehicle routing problem for Iowa recycled paper by Tabu Search heuristic," Iowa State University, Retrospective Theses and Dissertations, 1996, 96 pages.
M. Mahajan "Backward and Forward Scheduling," http://www.erpgreat.com/sap-sd/backward-and-forward-scheduling-in-sap-sd.htm, Jun. 30, 2018, 2 pages.
J. Xu, "Client-Side Data Caching in Mobile Computing Environments," Hong Kong University of Science and Technology, Thesis, UMI No. 3058186, Jun. 2002, 176 pages.
Supachai Pathumnakul, "Solving multi-depot vehicle routing problem for Iowa recycled paper by Tabu Search heuristic," A thesis submitted to the graduate faulty in partial fulfillment requirements for the degree of Master of Science, Iowa State University, (1996), 96 pages.
R. Carbonneau et al., "Application of machine learning techniques for supply chain demand forecasting," European Journal of Operational Research, 184 (2008), pp. 1140-1154.

\* cited by examiner

SYSTEMS AND METHODS FOR COMBINATORIAL RESOURCE OPTIMIZATION

CROSS-REFERENCE TO RELATED APPLICATIONS

This application is a continuation of U.S. patent application Ser. No. 16/007,913, filed Jun. 13, 2018, and entitled "SYSTEMS AND METHODS FOR COMBINATORIAL RESOURCE OPTIMIZATION," which is a continuation-in-part of U.S. patent application Ser. No. 15/876,007, filed Jan. 19, 2018, now U.S. Pat. No. 11,475,395, and entitled "SYSTEMS AND METHODS FOR COMBINATORIAL RESOURCE OPTIMIZATION," which are incorporated herein in their entireties.

TECHNICAL FIELD

This application relates generally to combinatorial resource optimization, and more particularly, relates to optimizing delivery routes in a goods delivery system.

BACKGROUND

At least some known systems and industries provide delivery services to their customers. For example, some industries provide the delivery of goods, such as grocery items, to their customers, which has increasingly become a method by which consumers obtain their grocery needs. For grocery delivery services, the use of delivery vehicle resources can be optimized in order to achieve an efficient and profitable grocery delivery service. One particular optimization solution or system is resource optimization and vehicle routing (ROVR), which is designed to optimize grocery delivery routes based on a number of factors in order to make efficient use of delivery vehicle resources.

However, current solutions, including ROVR cannot scale to handle large order sizes (e.g., 2000 or more orders per day). As the number of delivery orders increases, the combinatorial space to be explored (i.e., the complexity of the optimization problem) increases exponentially. For example, doubling the number of orders may result in an exponential increase in the number of alternative delivery routes that are explored and/or considered. In addition, computational resources become bottlenecked, as the time required to optimize delivery routes increases once the number of orders becomes larger. For example, a single optimization can take longer than three minutes, which may significantly affect an optimization system's ability to allocate computation resources to other stores among a collection of hundreds of stores.

SUMMARY

In various embodiments, a system including a computing device is disclosed. The computing device is configured to define at least one scheduler and at least one optimizer. The at least one scheduler is configured to receive a request to schedule a delivery for an origination location. The request includes a desired time slot. The request is compared to a persistent delivery snapshot for the origination location to determine availability of the desired time slot. An interim delivery snapshot including the requested delivery is generated when the persistent delivery snapshot has an available time slot corresponding to the desired time slot. The at least one optimizer is configured to receive the interim delivery snapshot and generate an updated persistent delivery snapshot by applying an optimization process to the interim delivery snapshot In various embodiments, a method is disclosed. The method includes the step of defining a plurality of schedulers and a plurality of optimizers. A request to schedule a delivery for predetermined first origination location is received at a selected one of the plurality of schedulers. The request includes a desired time slot. The selected one of the plurality of schedulers compares the request to a persistent delivery snapshot for the first origination location to determine availability of the desired time slot and generates an interim delivery snapshot including the requested delivery when the persistent delivery snapshot has an available time slot corresponding to the desired time slot. A selected one of the plurality of optimizers receives the interim delivery snapshot and generates an updated persistent delivery snapshot by applying an optimization process to the interim delivery snapshot.

In various embodiments, a non-transitory computer readable medium having instructions stored thereon is disclosed. The instructions, when executed by a processor cause a device to perform operations including defining a plurality of schedulers and a plurality of optimizers. A selected one of the plurality of schedulers receives a request to schedule a delivery for predetermined first origination location. The request includes a desired time slot. The selected one of the plurality of schedulers compares the request to a persistent delivery snapshot for the first origination location to determine availability of the desired time slot and generates an interim delivery snapshot including the requested delivery when the persistent delivery snapshot has an available time slot corresponding to the desired time slot. A selected one of the plurality of optimizers receives the interim delivery snapshot and generates an updated persistent delivery snapshot by applying an optimization process to the interim delivery snapshot.

DETAILED DESCRIPTION

As discussed above, existing solutions or systems for resource optimization cannot scale to handle large numbers of orders and do not enable sufficient flexibility with computational resources. The embodiments described herein facilitate the efficient optimization of resources in large-scale delivery systems. The embodiments described herein include, for example, the estimation of a number of available time windows for a delivery, and the presenting of available time windows to a user. The embodiments also include the determination of delivery routes for one or more vehicles and the subsequent optimization of the determined delivery routes. Although the embodiments described herein illustrate delivery resource optimization systems and methods used for the delivery of grocery goods or items, the embodiments discussed herein are not limited to such systems and methods and one of ordinary skill in the art will appreciate that the current disclosure may be used in connection with any type of system or method that addresses various different types of combinatorial optimization problems.

Figure 1A:
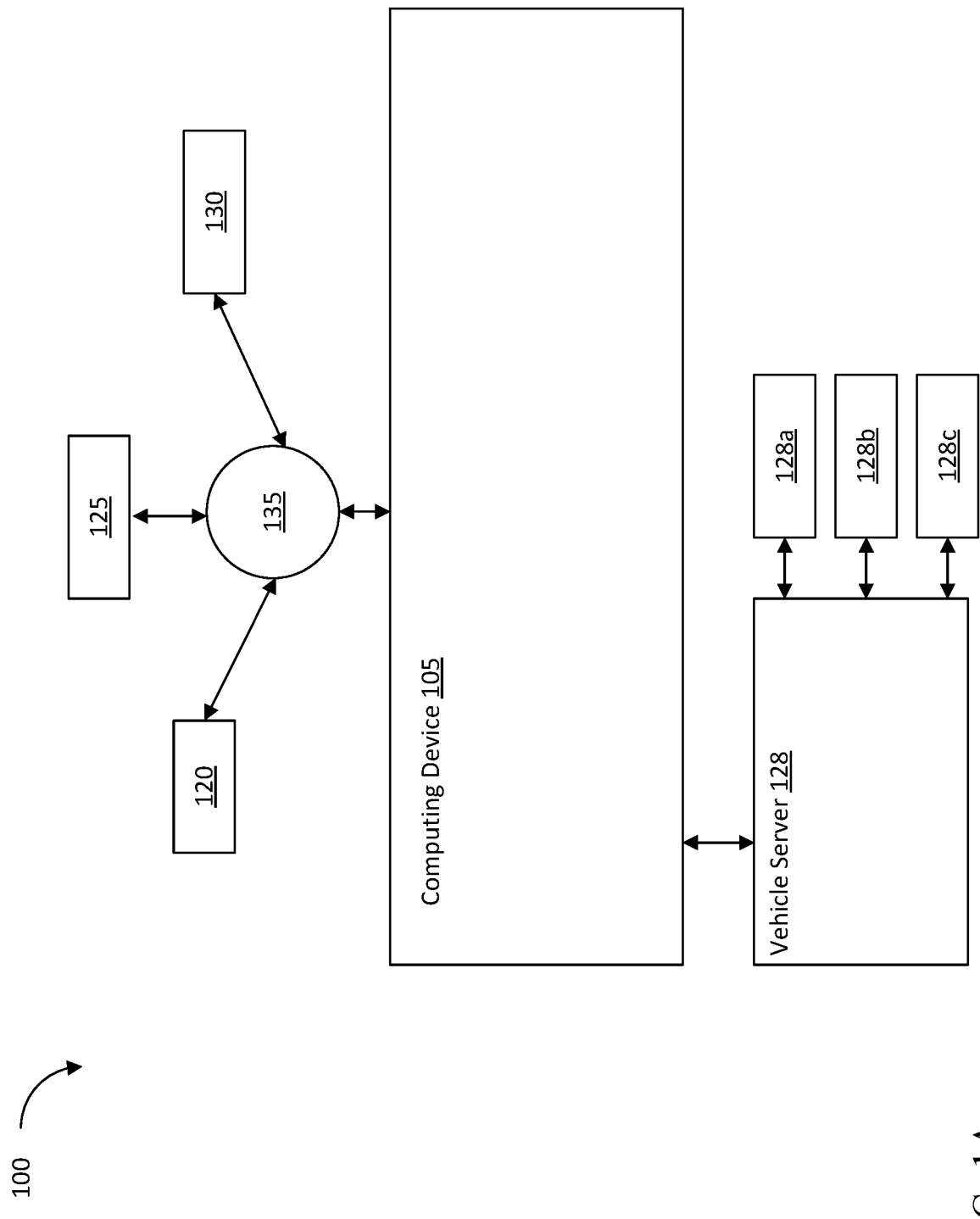
FIG. 1A illustrates an exemplary system in accordance with some embodiments of the present disclosure.

FIG. 1A illustrates a system 100 in accordance with exemplary embodiments of the present disclosure. System 100 may be utilized, for example, in optimizing the use of a plurality of vehicles (not shown) in delivering groceries to users. System 100 may include a server 105, one or more user terminals, such as terminals 120, 125, and 130, and a vehicle server 128, that are each coupled to server 105. System 100 may further include vehicles 128a-128c which are each communicatively coupled to vehicle server 128 and may receive delivery order assignments and delivery routes from server 105 via the vehicle server 128. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces.

Server 105, user terminals 120, 125, and 130, and vehicle server 128 can each be a computing device that can be, for example, a desktop computer, laptop, mobile device, tablet, thin client, or other device having a communications interface (not shown) that can communicate with other components of system 100, as explained in more detail below with respect to FIG. 1B.

In some embodiments, server 105 is associated with a retail store, for example a grocery store. Server 105 may include information about the retail items that are available from the retail store. For example, server 105 can maintain a database (such as database 160 shown in FIG. 1B) that includes details on the various retail items available from the retail store, the quantity of each item available from the retail store, the price of each item, and (if applicable) an amount of time before a particular retail item will perish after leaving the store (e.g. milk or fresh fruits). As will be discussed in further detail with respect to FIG. 2, server 105 may also maintain a database of vehicle availability which it may use to determine available time slots from the plurality of vehicles for presentation to a user (e.g. via user terminals 120, 125, and 130).

In some embodiments, vehicle server 128 enables communication between server 105 and each of the vehicles 128a-128c. As server 105 determines delivery order assignments and delivery routes (as discussed in more detail below), server 105 may communicate these assignments and routes to vehicle server 128, which may in turn communicate the assignments and routes to the corresponding vehicle. Vehicle server 128 may transmit information regarding a plurality of time slots for each of the vehicles in the plurality of vehicles to server 105. For example, vehicle server 128 may transmit information regarding the number of time slots a vehicle has per delivery route, the length of each time slot, and other pertinent information regarding the plurality of time slots for each vehicle 128a-128c. In some embodiments, the functions of the vehicle server 128 may be performed by server 105. In some embodiments, information regarding the plurality of time slots for each vehicle 128a-128c may be maintained by the vehicle server 128, the server 105, and/or any other suitable system. Assignments and routes may be calculated by the server 105 and provided to the vehicles 128a-128c once a final assignment and route is determined.

In some embodiments, each user terminal 120, 125, and 130, can be accessed by a user to enable the user to communicate with server 105. Each user terminal 120, 125, and 130 may be capable of connecting to and communicating with server 105 via network 135 (for example, via the internet). The user can use terminals 120, 125, and 130 for accessing information from server 105, such as the retail items that are available for purchase and available delivery time slots, as discussed in more detail herein.

During operation, as explained in more detail below with respect to FIGS. 1A, 2, 3A, 3B, 4A, 4B, and 5-8, system 100 can be used to facilitate the efficient delivery of goods, such as grocery and/or other retail items. For example, server 105 may receive delivery orders from user terminals 120-130 via network 135. Such orders may be received from a variety of locations. As discussed above, although discussed in terms of retail delivery, the embodiments described herein may be utilized to solve any combinatorial optimization problem. Upon receiving a delivery order from any of user terminals 120-130, server 105 may assign the delivery order to an appropriate vehicle among the plurality of vehicles 128a-128c and determine an appropriate delivery route for that vehicle based on one or more delivery parameters. Server 105 may transmit the assignment and route information to the appropriate delivery vehicle via vehicle server 128.

Figure 1B:
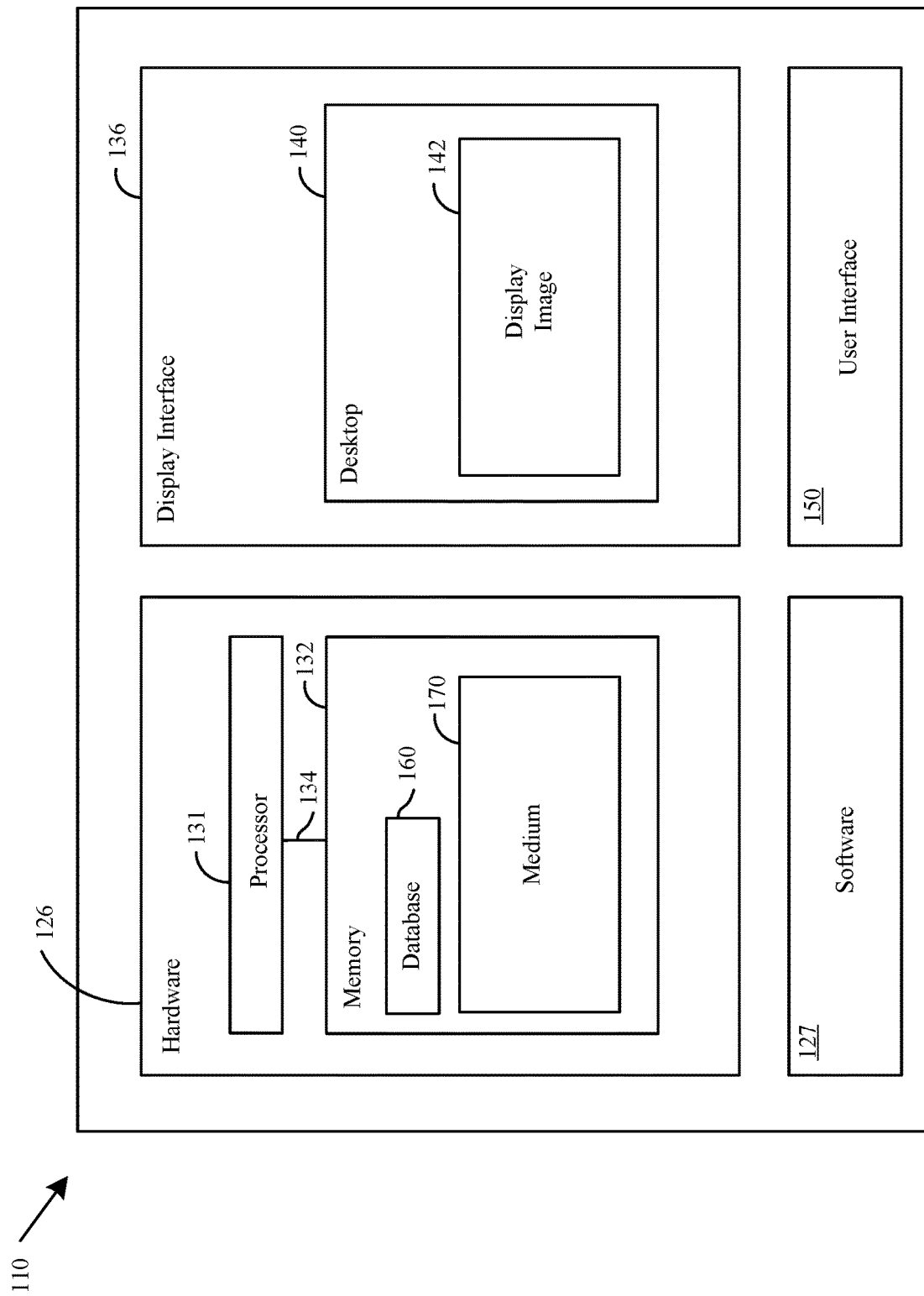
FIG. 1B illustrates an exemplary computing device that may be used with the system shown in FIG. 1A, in accordance with some embodiments of the present disclosure.

FIG. 1B is a block diagram of an exemplary computing device 110, which may be used to implement one or more of server 105, user terminals 120, 125, and 130, and/or vehicle server 128 (shown in FIG. 1A). In some embodiments, computing device 110 includes a hardware unit 126 and software 127. Software 127 can run on hardware unit 126 such that various applications or programs can be executed on hardware unit 126 by way of software 127. In some embodiments, the functions of software 127 can be implemented directly in hardware unit 126, e.g., as a system-on-a-chip, firmware, field-programmable gate array ("FPGA"), etc. In some embodiments, hardware unit 126 includes one or more processors, such as processor 131. In some embodiments, processor 131 is an execution unit, or "core," on a microprocessor chip. In some embodiments, processor 131 may include a processing unit, such as, without limitation, an integrated circuit ("IC"), an ASIC, a microcomputer, a programmable logic controller ("PLC"), and/or any other programmable circuit. Alternatively, processor 131 may include multiple processing units (e.g., in a multi-core configuration). The above examples are exemplary only, and, thus, are not intended to limit in any way the definition and/or meaning of the term "processor."

Hardware unit 126 also includes a system memory 132 that is coupled to processor 131 via a system bus 234. Memory 132 can be a general volatile RAM. For example, hardware unit 126 can include a 32 bit microcomputer with 2 Mbit ROM and 64 Kbit RAM, and/or a few GB of RAM. Memory 132 can also be a ROM, a network interface (NIC), and/or other device(s).

In some embodiments, computing device 110 can also include at least one media output component or display interface 136 for use in presenting information to a user. Display interface 136 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 110 can output at least one desktop, such as desktop 140. Desktop 140 can be an interactive user environment provided by an operating system and/or applications running within computing device 110, and can include at least one screen or display image, such as display image 142. Desktop 140 can also accept input from a user in the form of device inputs, such as keyboard and mouse inputs. In some embodiments, desktop 140 can also accept simulated inputs, such as simulated keyboard and mouse inputs. In addition to user input and/or output, desktop 140 can send and receive device data, such as input and/or output for a FLASH memory device local to the user, or to a local printer.

In some embodiments, display image 142 can be presented to a user on computer displays of a remote terminal (not shown). For example, computing device 110 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 110 and the remote terminals or the servers, such that remote end users can access the information from computing device 110.

In some embodiments, computing device 110 includes an input or a user interface 150 for receiving input from a user. User interface 150 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 110, in some embodiments, can include a database 160 within memory 132, such that various information can be stored within database 160.

Alternatively, in some embodiments, database 160 can be included within a remote server (not shown) with file sharing capabilities, such that database 160 can be accessed by computing device 110 and/or remote end users. In some embodiments, a plurality of computer-executable instructions can be stored in memory 132, such as one or more computer-readable storage media 170 (only one being shown in FIG. 1). Computer storage medium 170 includes non-transitory media and may include volatile and nonvolatile, removable and non-removable mediums implemented in any method or technology for storage of information such as computer-readable instructions, data structures, program modules or other data. The instructions may be executed by processor 131 to perform various functions described herein, e.g., steps of the method shown in FIG. 5.

Figure 1C:
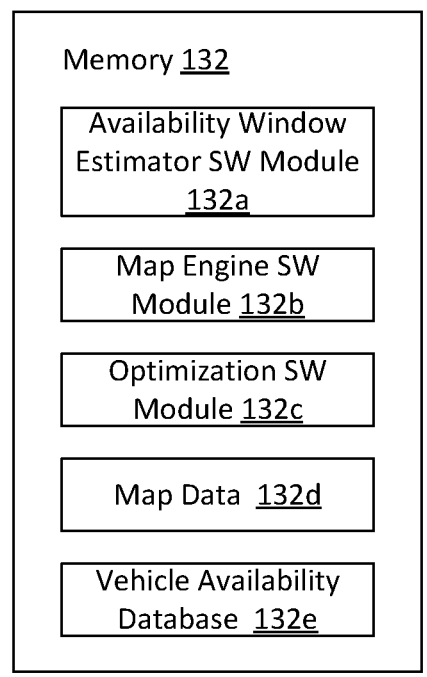
FIG. 1C illustrates an exemplary memory for storing instructions for executing steps of a method that may be used with the system shown in FIG. 1A, in accordance with some embodiments of the present disclosure.

FIG. 1C illustrates an example of computer-executable instructions that can be stored in memory 132 as software (SW) modules. Memory 132 may include the following SW modules: (1) an availability window estimator SW module 132a that is configured to determine a number of available time slots for delivery of groceries; (2); a map engine SW module 132b that is configured to assign delivery orders to vehicles and determine the sequence in which a particular vehicles orders will be delivered (delivery route); (3) an optimization SW module 132c that is configured to optimize the delivery route for each vehicle having at least one delivery order assigned to it.

Memory 132 may further store map data 132d of the geographic area serviced by one or more store fronts as well as a vehicle availability database 132e that stores a snapshot of the current capacity of each vehicle in the plurality of vehicles and the time slots each vehicle has available.

Referring back to FIG. 1A, in some embodiments, server 105 may determine and present a number of available delivery time slots to a user. More specifically, server 105 may generate a synthetic order and compare the synthetic order to a snapshot of the plurality of vehicles (as described below with respect to FIG. 2) retrieved from, for example, vehicle availability database 132e (shown in FIG. 1C). Server 105 may identify the time slots having at least one of the plurality of vehicles available for delivery during that time slot and communicate those time slots to the user via user terminals 120-130. For example, vehicle server 128 may transmit information regarding the number of time slots each vehicle has, and the length of each time slot. Server 105 may determine which vehicles among the plurality of vehicles has sufficient capacity to accommodate the synthetic order. Upon determining which vehicles have sufficient capacity, server 105 may insert the synthetic order into each time slot in each of the vehicles having sufficient capacity. For each time slot the synthetic order is inserted into, server 105 may determine whether the insertion is feasible. In other words, server 105 may determine if all of the vehicle's other delivery orders can be met (e.g. delivered on time) if the synthetic order is inserted into that time slot and remove those time slots that would result in the vehicle being unable to fulfill one or more of its previously scheduled deliveries. Alternatively, in some embodiments, the server 105 may receive a request for a delivery from a user terminal 120-130 including a desired time slot. The server 105 may attempt to update the snapshot to include the delivery received from the user terminal 120-130 at the desired time slot.

Figure 2:
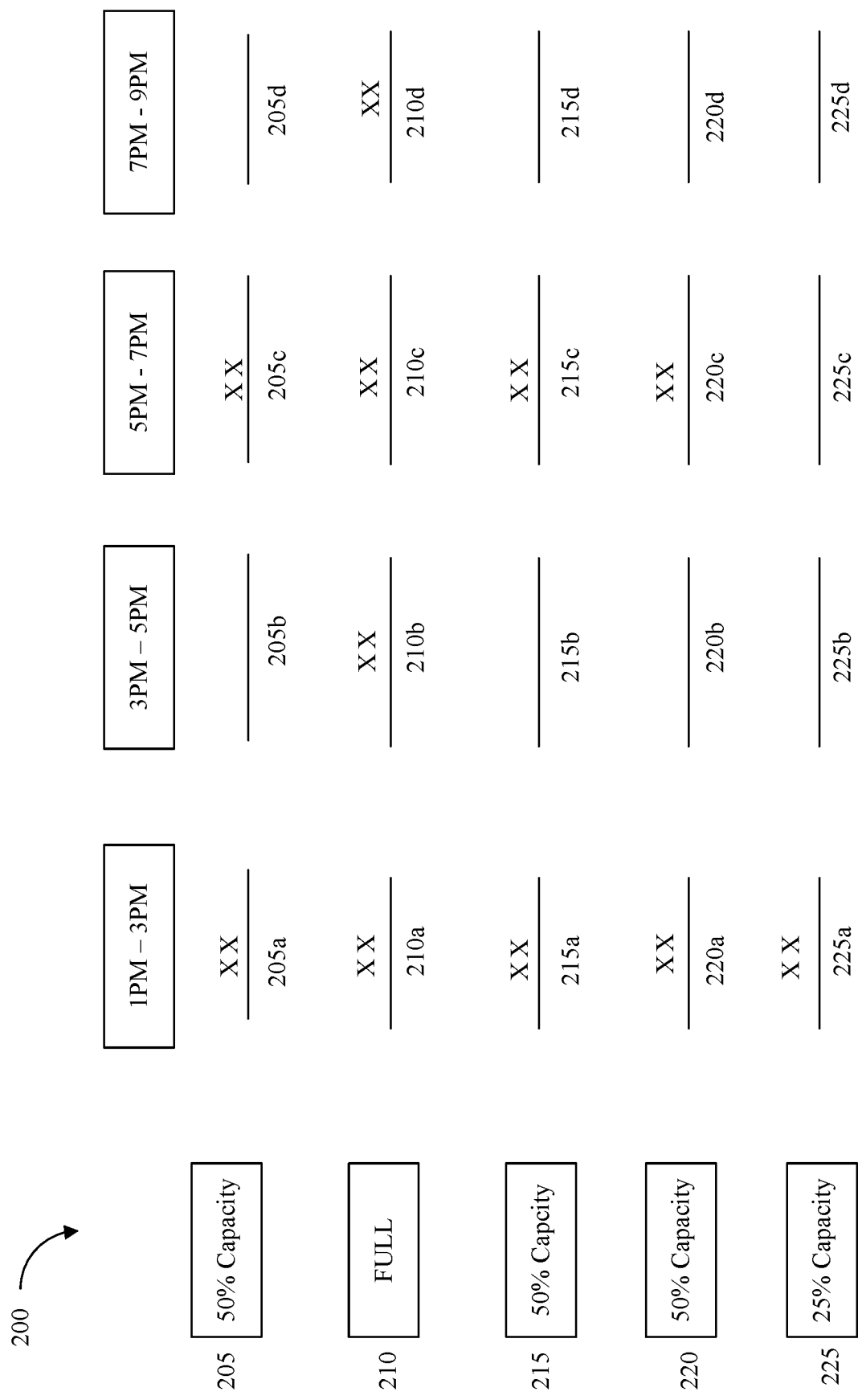
FIG. 2 illustrates an exemplary diagram of vehicle availability that may be used with the system shown in FIG. 1A, in accordance with some embodiments of the present disclosure.

FIG. 2 illustrates a snapshot 200 of the time slot availability of a plurality of vehicles 205, 210, 215, and 220. The plurality of vehicles 205, 210, 215, and 220 are each associated with a predetermined origination point for the deliveries, such as, for example, a retail store or location, a warehouse, a delivery hub, etc. Although embodiments including four vehicles 205, 210, 215, and 220 are illustrated, it will be appreciated that each predetermined origination point can have any number of vehicles associated therewith. Snapshot 200 may be updated by the server 105 to include received deliveries. Alternatively, in some embodiments, the server 105 may generate an interim snapshot that is provided to an optimizer and/or an optimization queue for optimization, as discussed in greater detail below. Each vehicle 205, 210, 215, and 220 may have 4 available time slots (ranging from 1 PM to 9 PM). It should be noted that time slots of any appropriate length and/or time may be used. As shown in FIG. 2, vehicle 205 has time slots 205a-205d while vehicle 210 has time slots 210a-210d etc. In the example of FIG. 2, vehicle 210 may not have any capacity, thus server 105 may refrain from assigning any further delivery orders to it. In addition, none of the vehicles 205-225 may have availability in the 1 PM-3 PM time slot, while only vehicle 225 has availability in the 5 PM-7 PM time slot, corresponding to time slot 225c. Thus, in the example of FIG. 2, server 105 may present three time slots (3 PM-5 PM, 5 PM-7 PM, and 7 PM-9 PM) to a customer wishing to place a delivery order.

Figure 6:
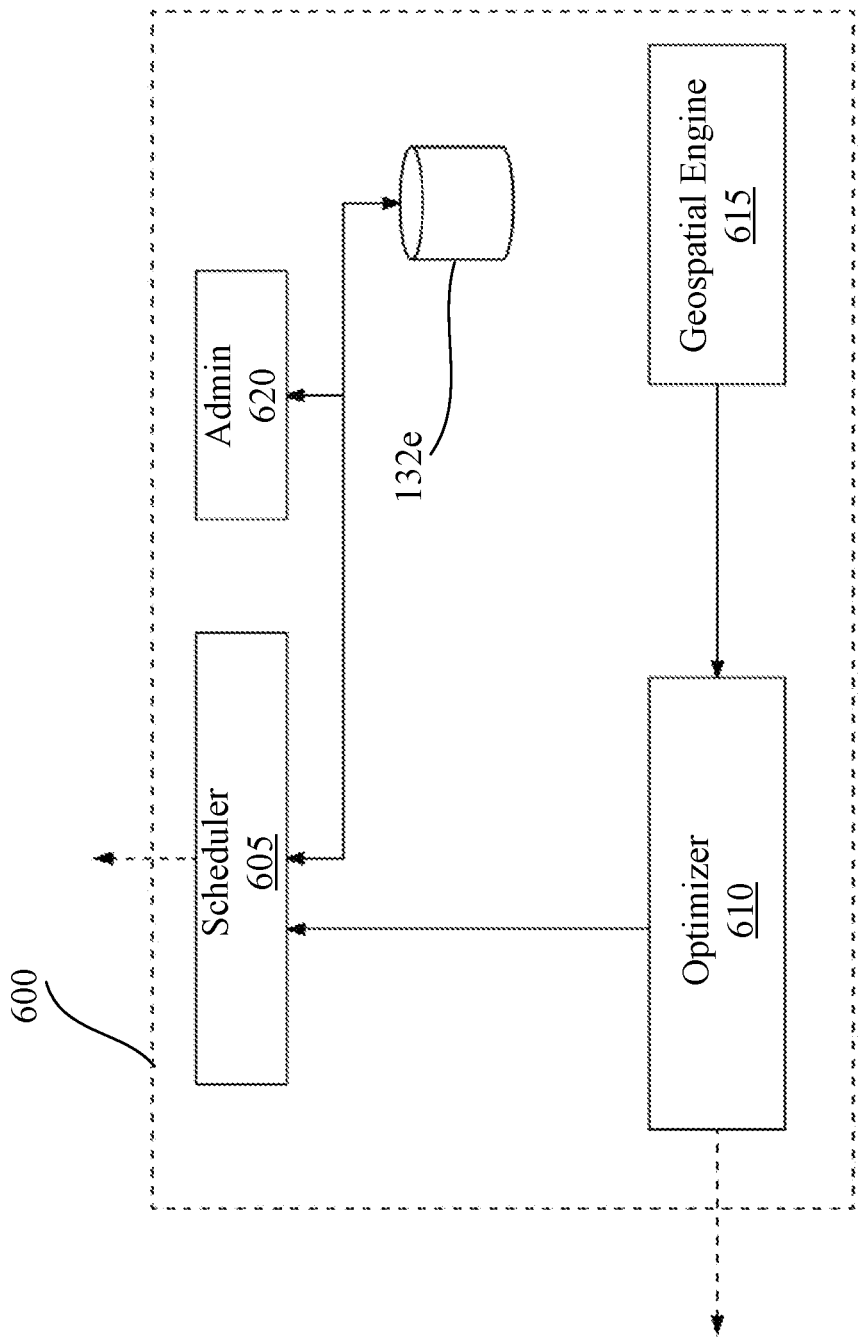
FIG. 6 illustrates an exemplary diagram of a horizontally-saleable system configured to provide routing capability and resource optimization, in accordance with some embodiments of the present disclosure.

Referring back to FIG. 1A, upon receiving a delivery order indicating a delivery address and a selected time slot, server 105 (such as a scheduler implemented by the server 105 as discussed below in conjunction with FIGS. 6-8) may determine a delivery route for one or more vehicles 205, 210, 215, and 220 in the plurality of vehicles. More specifically, server 105 may assign a received delivery order is to a selected one of the plurality of vehicles 205, 210, 215, and 220, re-assign one or more to orders a different vehicle 205, 210, 215, and 220 in order to optimize vehicle resources, and/or sequence each vehicle's 205, 210, 215, and 220 assigned delivery orders to minimize cost. In some embodiments, server 105 is configured to assign the received delivery order to, and determine a delivery route for, a vehicle 205, 210, 215, and 220 from the plurality of vehicles 205, 210, 215, and 220 based on the selected time slot of the received order, map data 132d, and/or an overall cost that is a function of a number of delivery parameters. In some embodiments, server 105 may re-assign delivery orders to, and determine delivery routes for, other vehicles in the plurality of vehicles 205, 210, 215, and 220 based on the selected time slot of the received order, map data 132d, and/or an overall cost that is a function of a number of delivery parameters. Examples of such delivery parameters may include, but are not limited to, number of vehicles from the plurality needed to deliver all orders, total number of miles driven by the vehicles during delivery, total driving time of the vehicles during delivery, total amount of idle time of the vehicles during delivery, and degree of lateness in delivering an order (if any) among others. Server 105 may utilize a meta-heuristic algorithm, such as simulated annealing, in order to determine which vehicle the received delivery order is to be assigned to, as well as the sequence in which that vehicle's delivery orders are to be delivered. In addition, server 105 may utilize the meta-heuristic algorithm to determine whether certain delivery orders need to be re-assigned to a different vehicle in order to optimize vehicle resources, and the sequence in which each vehicle's assigned delivery orders will be delivered (delivery route). In some embodiments, server 105 may assign a particular weight to each delivery parameter when assigning delivery orders and determining delivery routes for the one or more vehicles. For example, server 105 may assign total mileage the largest weight, and thus may assign delivery orders to and determine delivery routes for the one or more vehicles from the plurality of vehicles based primarily on reducing the total miles driven by the one or more vehicles, as this will have the largest impact on the overall cost. In this way, server 105 may determine one or more delivery routes.

Figure 3B:
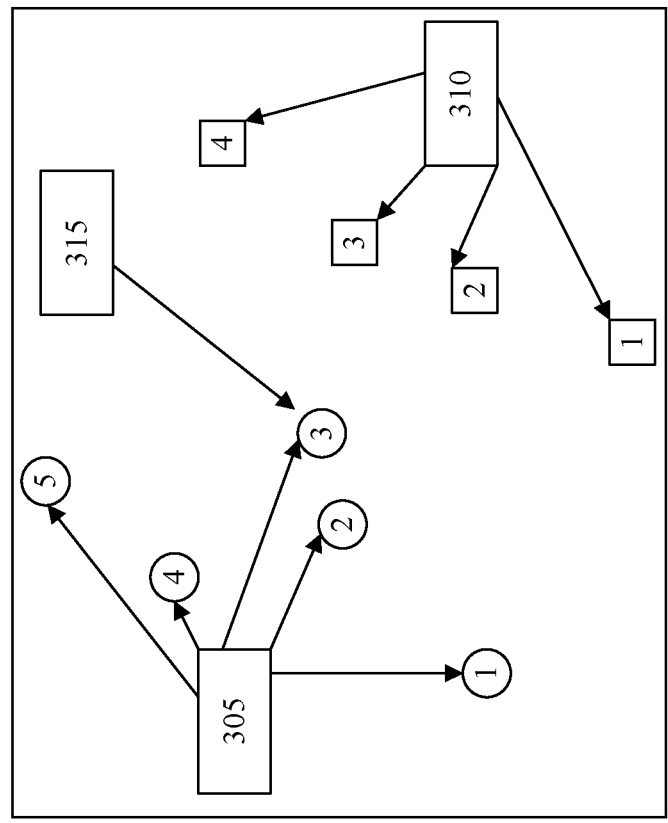
FIG. 3B illustrates an exemplary diagram of the route map for one or more delivery vehicles after assigning the delivery route that may be used with the system shown in FIG. 1A, in accordance with some embodiments of the present disclosure.
Figure 3A:
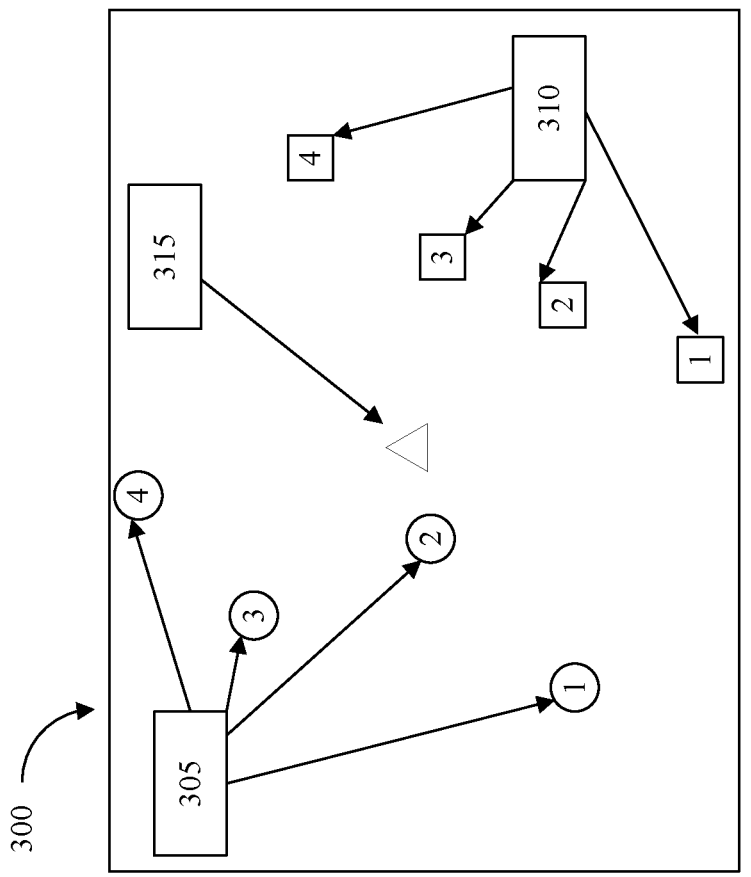
FIG. 3A illustrates an exemplary diagram of a route map for one or more delivery vehicles prior to assigning a delivery route or option that may be used with the system shown in FIG. 1A, in accordance with some embodiments of the present disclosure.

FIG. 3A illustrates a delivery route map 300 for a first and second delivery vehicle in accordance with some embodiments of the present disclosure. Delivery route 305 may indicate the delivery route of the first vehicle, while delivery route 310 may indicate the delivery route of the second vehicle. Delivery order 315 may indicate the delivery address of a delivery order that is yet to be assigned to a particular vehicle. As an initial matter, server 105 may determine that assigning delivery order 315 to the first delivery vehicle for delivery in the same time slot as delivery number 2 will not prevent the first delivery vehicle from completing any of its subsequent deliveries on time. Server 105 may make a similar determination with respect to assigning delivery order 315 to the second delivery vehicle for delivery in the time slot for its delivery number 2. In addition, server 105 may determine that the delivery address of delivery order 315 is in close proximity to the delivery address of delivery number two for the first delivery vehicle and is also relatively far from any of the delivery addresses in the second vehicles delivery route 310. Thus, server 105 may determine that the total number of miles required to be driven will be minimized if delivery order 315 is assigned to the first delivery vehicle for delivery after delivery number 2. Server 105 may also determine that the number of miles driven can be further reduced if the first delivery vehicle delivers delivery order 315 after its current delivery number two (as delivery number two is on the way). Therefore, server 105 may assign delivery order 315 to the first delivery vehicle, and sequence it for delivery right after delivery number 2. FIG. 3B illustrates the new delivery route for the first delivery vehicle.

In some embodiments, server 105 may further optimize each vehicle's delivery route. Server 105 may utilize any suitable local search algorithm, such as 1-0 exchange in order to calculate an optimized delivery route for each vehicle. Server 105 may randomly select a delivery order from among the plurality of delivery routes, and iteratively insert the randomly selected delivery order into one or more randomly selected time slots from the plurality of delivery routes. Server 105 may then determine the cost effect of each insertion. In some embodiments, server 105 may insert the randomly selected delivery order into every time slot from the plurality of delivery routes and calculate the cost effect of every insertion. In still other embodiments, server 105 may determine which routes among the plurality of delivery routes have available time slots that overlap with the time slot of the randomly selected delivery order. Server 105 may only insert the randomly selected delivery order into those routes having an available time slot that overlaps with the time slot of the randomly selected delivery order. Server 105 may insert the randomly selected delivery order into the time slot resulting in the largest reduction in overall cost. In some embodiments, server 105 may perform multiple iterations of the above described process to further optimize each vehicle's delivery route.

Figure 4A:
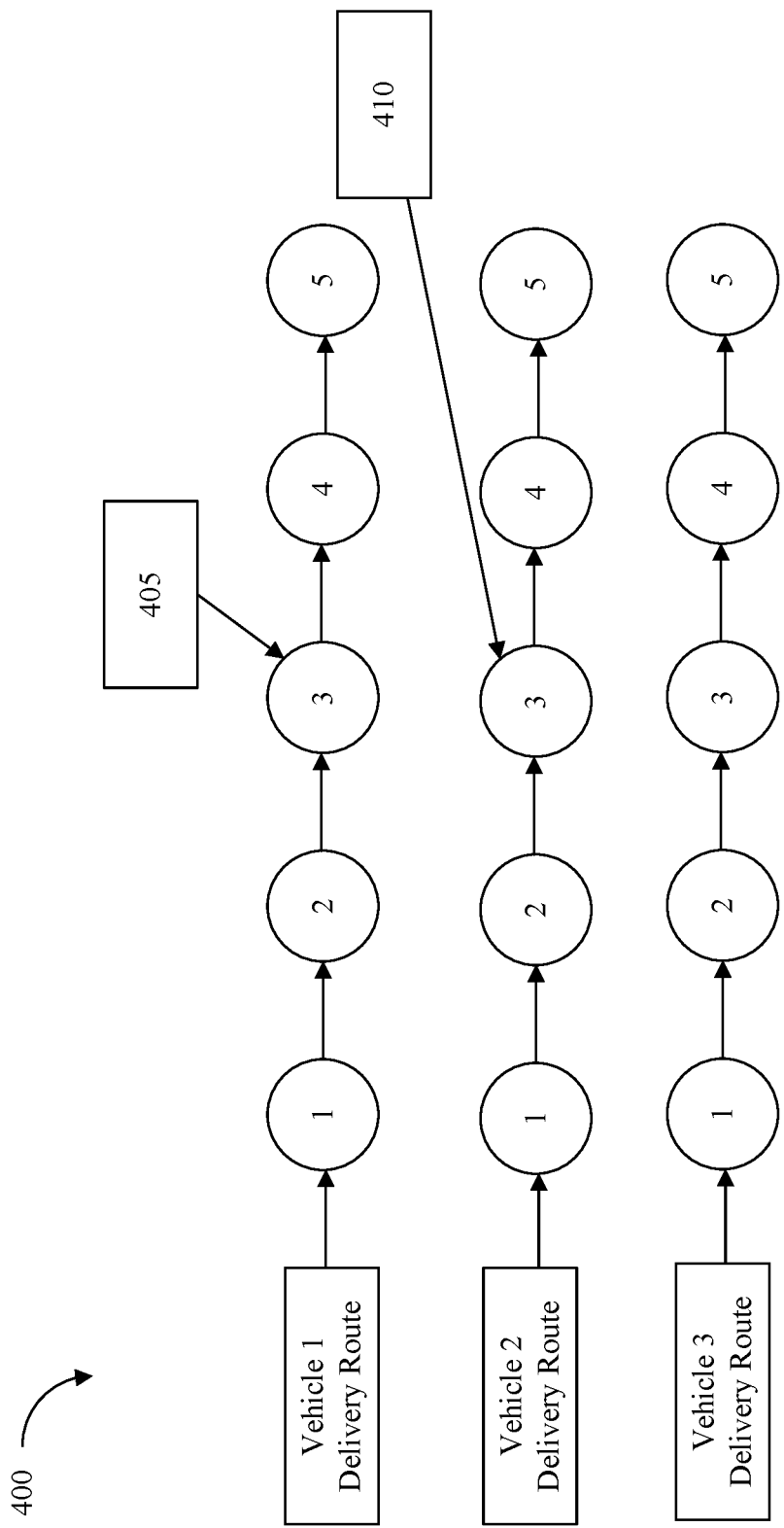
FIG. 4A illustrates an exemplary diagram of a plurality of delivery routes prior to optimization that may be used with the system shown in FIG. 1A, in accordance with some embodiments of the present disclosure.
Figure 4B:
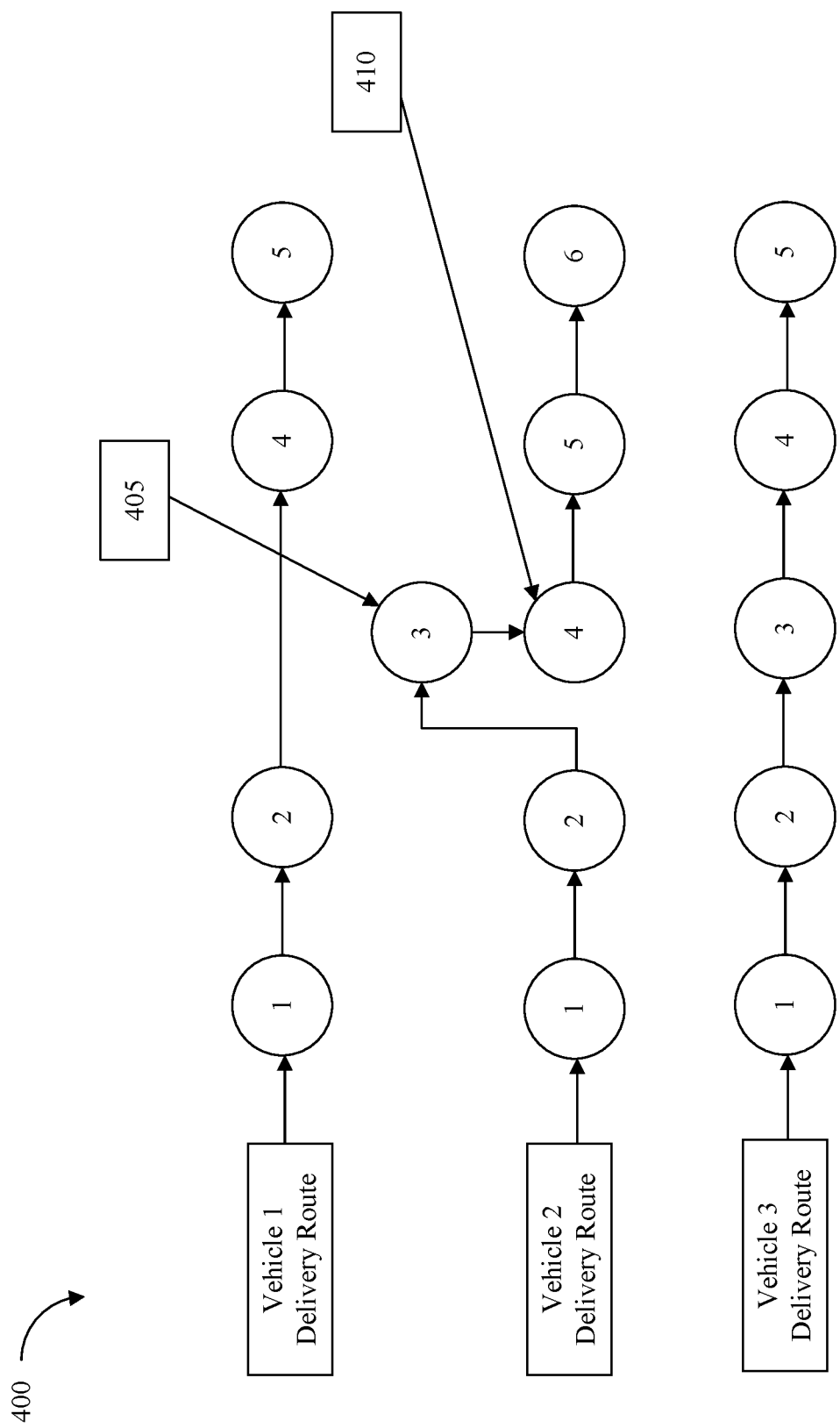
FIG. 4B illustrates an exemplary diagram of the plurality of delivery routes during optimization that may be used with the system shown in FIG. 1A, in accordance with some embodiments of the present disclosure.

FIG. 4A illustrates delivery routes for three vehicles. Server 105 may randomly select delivery order 405 corresponding to delivery number 3 in vehicle one's delivery route. Server 105 may then randomly select the time slot of delivery order 410 corresponding to delivery number 3 in vehicle two's delivery route and insert delivery order 405 into the time slot containing delivery order 410. FIG. 4B illustrates the updated delivery routes after the insertion by server 105. Server 105 may calculate the cost effect of inserting delivery order 405 into delivery order 410's slot as illustrated in FIG. 4B. More specifically, server 105 may determine the cost effect based on an increase or decrease (if any) in the total number of miles driven by each vehicle during delivery, total driving time for each vehicle during delivery, total amount of idle time for each vehicle during delivery, number of trucks needed to deliver all orders, and degree of lateness (if any) based on inserting delivery order 405 into delivery order 410's time slot. As discussed above, in some embodiments, certain factors (e.g. total mileage, degree of lateness) may have been assigned a greater weight, and therefore even relatively small increases in those factors may result in a significantly larger overall cost. Server 105 may iteratively insert delivery order 405 into one or more random time slots and calculate the cost effect of each such insertion. Server 105 may reassign delivery order 405 to the time slot resulting in the largest reduction in overall cost. If no time slot would result in a reduction of overall cost, server 105 may refrain from reassigning delivery order 405.

Referring back to FIG. 1, in some embodiments, server 105 may assign degree of lateness a relatively heavy weight, as a late delivery can result in severe consequences (e.g. easily perishable goods going bad). However, a certain degree of lateness may be tolerable if a significant improvement in one or more other parameters is achieved by an insertion. For example, if an improvement in the overall cost due to a relatively large reduction in total mileage driven by all vehicles is achieved, and the degree of lateness will not result in goods of a delivery order perishing, then server 105 may allow the insertion (if the cost effect is superior to the cost effect of other insertions).

In some embodiments, server 105 may generate an updated snapshot of time slot availability for the plurality of vehicles and store the updated snapshot in vehicle availability database 132e for presentation to online users and/or transmission to the vehicles 128-128c. The updated snapshot may be based on the optimized delivery routes determined for the one or more vehicles in the plurality of vehicles.

As described above, server 105 may assign delivery orders and optimize delivery routes whenever a new delivery order is received from a user terminal 120-135. In some embodiments, server 105 may continuously optimize the delivery routes of each vehicle at pre-defined intervals until a pre-defined time period before the delivery route is to commence. In other embodiments, server 105 may optimize delivery routes in response to receiving a new delivery order until a pre-defined time period before the delivery route is to commence.

In some embodiments, server 105 may transmit the optimized delivery routes to the corresponding vehicles among the plurality of vehicles 128a-c via vehicle server 128, which may act as a relay to provide the optimized delivery routes to the corresponding vehicles.

Figure 5:
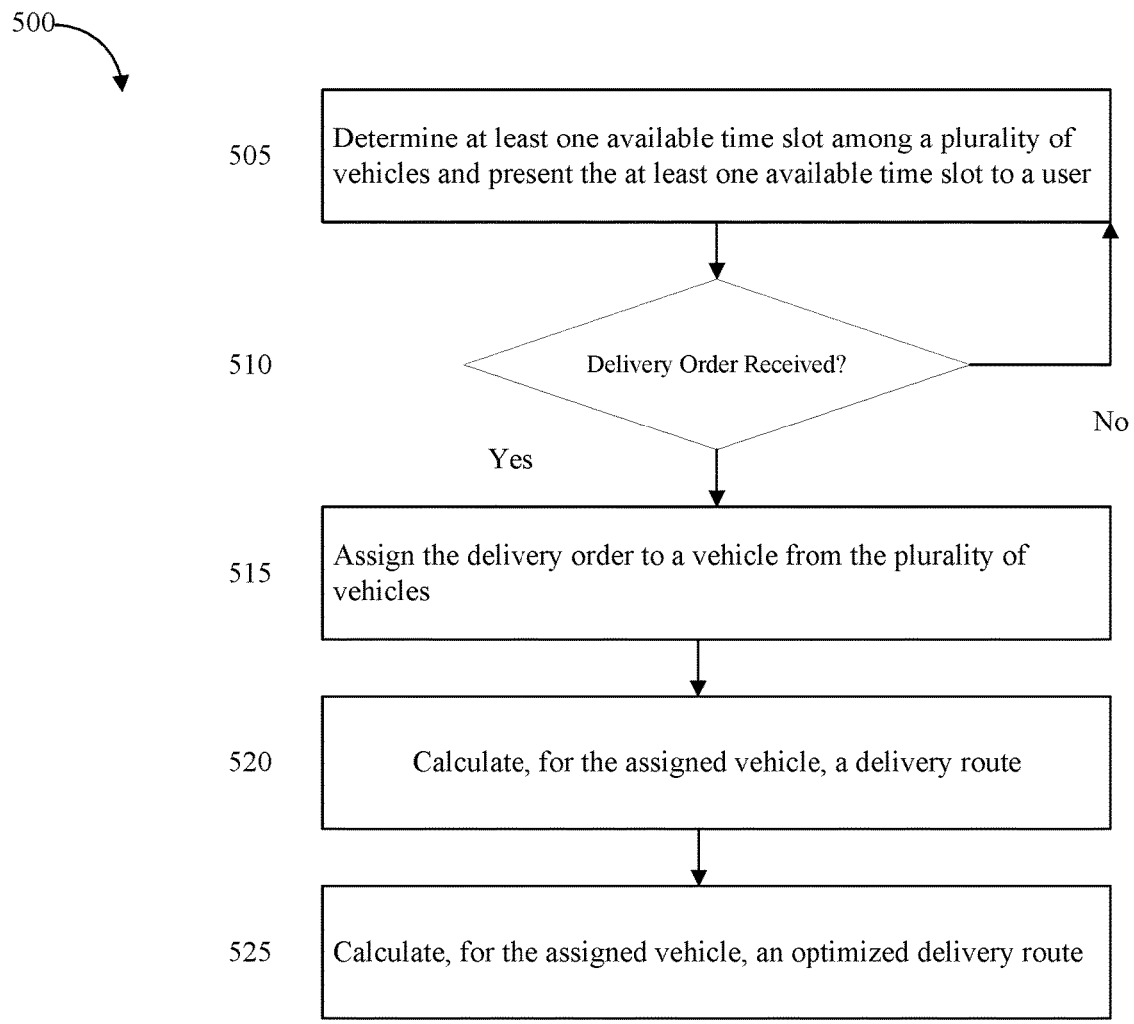
FIG. 5 illustrates a flow diagram of a method for optimizing a plurality of vehicle resources during delivery of goods using the system shown in FIG. 1A, in accordance with some embodiments of the present disclosure.

FIG. 5 illustrates a flow diagram of a method 500 for optimizing delivery vehicle resources in accordance with some exemplary embodiments of the present disclosure. Method 500 may be performed by, server 105 described with respect to FIG. 1, for example.

At 505, server 105 may determine a number of available delivery time slots and present them to a user. More specifically, server 105 may generate a synthetic order and compare the synthetic order to a snapshot of the time slot availability of the plurality of vehicles (as described above with respect to FIG. 2) retrieved from vehicle availability database 132e (shown in FIG. 1C). Server 105 may maintain the snapshot based on information received from vehicle server 128 regarding the plurality of time slots each vehicle in the plurality of vehicles has. For example, vehicle server 128 may transmit information regarding the number of time slots each vehicle has, and the length of each time slot. Server 105 may determine which vehicles among the plurality of vehicles has sufficient capacity to accommodate the synthetic order. Upon determining which vehicles have sufficient capacity, server 105 may insert the synthetic order into each time slot in each of the vehicles having sufficient capacity. For each time slot the synthetic order is inserted into, server 105 may determine whether the insertion is feasible. In other words, server 105 may determine if all of the vehicle's other delivery orders can be met (e.g. delivered on time) if the synthetic order is inserted into that time slot and remove those time slots that would result in the vehicle being unable to fulfill one or more of its previously scheduled deliveries. At this point, server 105 may identify the time slots having at least one of the plurality of vehicles available for delivery during that time slot as acceptable delivery time slots and present them to the user via user terminals 120-130.

At 510 server 105 may determine whether a delivery order has been received. If server 105 determines that a delivery order has been received, at 515, server 105 may determine which vehicle the received delivery order is to be assigned to, and whether certain delivery orders need to be re-assigned to a different vehicle in order to optimize vehicle resources. At 520, server 105 may determine the sequence in which the assigned vehicle's delivery orders will be delivered. Server 105 may assign delivery orders to, and determine a delivery route for the vehicle based on the selected time slot of the received order, map data 132d, and an overall cost that is a function of a number of delivery parameters. In some embodiments, server 105 may also re-assign delivery orders to and determine delivery routes for other vehicles in the plurality of vehicles based on the selected time slot of the received order, map data 132d, and an overall cost that is a function of a number of delivery parameters. Examples of such delivery parameters may include number of vehicles from the plurality needed to deliver all orders, total number of miles driven by the vehicles during delivery, total driving time of the vehicles during delivery, total amount of idle time of the vehicles during delivery, and degree of lateness in delivering an order (if any) among others. Server 105 may utilize a meta-heuristic algorithm, such as simulated annealing, in order to determine which vehicle the received delivery order is to be assigned to, as well as the sequence in which that vehicle's delivery orders are to be delivered. In addition, server 105 may utilize the meta heuristic algorithm to determine whether certain delivery orders need to be re-assigned to a different vehicle in order to optimize vehicle resources, and the sequence in which each vehicle's assigned delivery orders will be delivered (delivery route). In some embodiments, server 105 may assign a particular weight to each delivery parameter when assigning delivery orders and determining delivery routes for the one or more vehicles. For example, server 105 may assign total mileage the largest weight, and thus may assign delivery orders to and determine delivery routes for the one or more vehicles from the plurality of vehicles based primarily on reducing the total miles driven by the one or more vehicles, as this will have the largest impact on the overall cost. In this way, server 105 may determine one or more delivery routes.

At 525, server 105 may further optimize each vehicle's delivery route. Server 105 may utilize any suitable local search algorithm, such as 1-0 exchange in order to calculate an optimized delivery route for each vehicle. Server 105 may utilize any suitable local search algorithm, such as 1-0 exchange in order to calculate an optimized delivery route for each vehicle. Server 105 may randomly select a delivery order from among the plurality of delivery routes, and iteratively insert the randomly selected delivery order into one or more randomly selected time slots from the plurality of delivery routes. Server 105 may then determine the cost effect of each insertion. In some embodiments, server 105 may insert the randomly selected delivery order into every time slot from the plurality of delivery routes and calculate the cost effect of every insertion. In still other embodiments, server 105 may determine which routes among the plurality of delivery routes have available time slots that overlap with the time slot of the randomly selected delivery order Server 105 may only insert the randomly selected delivery order into those routes having an available time slot that overlaps with the time slot of the randomly selected delivery order. Server 105 may insert the randomly selected delivery order into the time slot resulting in the largest reduction in overall cost. In some embodiments, server 105 may perform multiple iterations of the above described process.

In some embodiments, server 105 may generate an updated snapshot of time slot availability for the plurality of vehicles and store the updated snapshot in vehicle availability database 132e for presentation to online users. The updated snapshot may be based on the optimized delivery routes determined for the one or more vehicles in the plurality of vehicles.

As described above, server 105 may assign delivery orders and optimize delivery routes whenever a new delivery order is received from a user terminal 120-135. In some embodiments, server 105 may continuously optimize the delivery routes of each vehicle at pre-defined intervals until a pre-defined time period before the delivery route is to commence. In other embodiments, server 105 may optimize delivery routes in response to receiving a new delivery order until a pre-defined time period before the delivery route is to commence.

In some embodiments, server 105 may transmit the optimized delivery routes to the corresponding vehicles among the plurality of vehicles 128a-c via vehicle server 128, which may act as a relay to provide the optimized delivery routes to the corresponding vehicles.

In some embodiments, server 105 is configured to provide a horizontally-scalable system to provide expansion to additional origination locations and increased throughput. FIG. 6 illustrates an exemplary optimization and routing block 600 configured to be implemented on a system, such as server 105. In some embodiments, the optimization and routing block 600 is configured to be implemented on a virtual machine or server. The optimization and routing block 600 can include a scheduler 605, an optimizer 610, a geospatial engine 615, a database 132e, and an administration block 620.

In some embodiments, a scheduler 605 is configured to receive delivery requests from user terminals 120-130, view available delivery slots, assign deliveries, and/or generate interim delivery snapshots to an optimizer 610. For example, in some embodiments, the scheduler 605 is configured to receive a request from a user to schedule a delivery. In some embodiments, the request from the user includes a desired time slot. The scheduler 605 obtains a persistent delivery snapshot for a plurality of vehicles 128a-128c associated with a predetermined origination location for the scheduled delivery. The persistent delivery snapshot may be an optimized delivery snapshot generated by an optimizer 610, as discussed in greater detail below. The persistent delivery snapshot can be loaded from a database 132e, provided directly from an optimizer 610, and/or otherwise obtained by the scheduler 605. The scheduler 605 reviews the available delivery slots. If the scheduler 605 determines that the desired time slot is available in the persistent delivery snapshot, the scheduler 605 inserts the requested delivery into the time slot to generate an interim delivery snapshot. If the scheduler 605 determines that the desired time slot is not available in the persistent delivery snapshot, the scheduler 605 sends a response to the user that the desired delivery time slot is not available.

After verifying that a selected time slot is available, the scheduler 605 is configured to insert the requested delivery in the persistent delivery snapshot to generate an interim delivery snapshot. The scheduler 605 inserts the requested delivery at one of the available open slots corresponding to the selected time slot. For example, in some embodiments, the scheduler 605 is configured to perform a cost function analysis to determine a delivery slot with the least cost for insertion of the requested delivery, as discussed above with respect to FIGS. 3A-3B.

In some embodiments, the scheduler 605 applies a dynamic programming approach to find a slot among multiple delivery snapshots and updates an existing delivery snapshot with the requested delivery. For example, in some embodiments, the scheduler 605 receives a request to schedule a delivery in a specific time slot, such as a 3 PM-5 PM time slot. The scheduler 605 obtains a persistent delivery snapshot for a first origination location and determines that the 3 PM-5 PM delivery window is not available. The scheduler 605 may obtain one or more additional delivery snapshots from the database 132e for the current origination location and/or may obtain persistent delivery snapshots for other origination locations that are located in proximity to the current origination location associated with the scheduler 605. For example, in some embodiments, the scheduler 605 obtains one or more alternative delivery snapshots from the database 132e and determines if the desired delivery time slot can be accommodated in any of the alternative delivery snapshots. If an alternative delivery snapshot can accommodate the requested delivery, the scheduler 605 can book the delivery in the desired time slot and generate an interim delivery snapshot from the alternative delivery snapshot.

The optimization and routing block 600 includes an optimizer (e.g., vehicle routing problem (VRP) optimizer) 610 configured to apply one or more routing optimization processes, such as discussed above with respect to FIGS. 2-5. For example, in some embodiments, the optimizer 610 is configured to receive an interim delivery snapshot from the scheduler 605 and apply a simulated annealing process, a 1-0 replacement process, and/or any other suitable optimization process to the interim delivery snapshot. As discussed above, an optimizer 610 can be configured to asses a plurality of factors each having a predetermined weighting during an optimization process. In various embodiments, the optimizer 610 can include a stateless optimizer or stateful optimizer.

In some embodiments, the optimizer 610 includes a stateless optimizer configured to receive a single order request and return an inline solution to scheduler 605. The stateless optimizer applies an optimization process, such as the simulated annealing process discussed above, to an interim delivery snapshot received from a scheduler 605 to generate an updated persistent delivery snapshot. In some embodiments, the optimizer 610 applies an optimization process for a predetermined number of cycles and/or a predetermined duration (as bound by a configurable upper limit). In some embodiments, the predetermined number of cycles corresponds to a predetermined optimization period.

In some embodiments, the optimizer 610 includes a stateful optimizer configured to receive an interim delivery snapshot and generate an updated persistent delivery snapshot. The updated persistent delivery snapshot is associated with a unique identifier (such as a job ID, etc.). The stateful optimizer can generate a call (such as a callback to the scheduler 605) and/or can store the updated persistent delivery snapshot in a database, such as database 132e. The updated persistent delivery snapshot is stored in the database. When the scheduler 605 (and/or an additional scheduler, as discussed below) requests a delivery snapshot for the predetermined origination location by providing the unique identifier, the stored (e.g., updated) persistent delivery snapshot is provided to the scheduler 605 as the current persistent delivery snapshot for the origination location.

In some embodiments, the optimizer 610 is configured to perform incremental optimization of one or more stored persistent delivery snapshots. The optimizer 610 can be configured to perform incremental optimization at a first predetermined interval, such as, for example, every five minutes, ten minutes, fifteen minutes, twenty minutes, etc. When initiating an incremental optimization process, the optimizer 610 obtains the persistent delivery snapshot (for example, from the database 132e and/or from an optimization queue as discussed below) and applies a predetermined optimization process for a predetermined number of cycles to generate an updated persistent delivery snapshot. The updated persistent delivery snapshot is stored in the database 132e and replaces the existing persistent delivery snapshot for the associated origination location. When a scheduler 605 receives a request to schedule a delivery, the scheduler 610 loads the persistent delivery snapshot from the database 132e and receives the most-recently optimized persistent delivery snapshot. In some embodiments, the persistent delivery snapshot is provided to one or delivery vehicles 128a-128c at a predetermined time, after which the persistent delivery snapshot cannot be further updated or edited by the scheduler 605 and/or the optimizer 610. The optimizer 610 may repeat the incremental optimization process at the predetermined interval on the same and/or a different persistent delivery snapshot stored in the database 132e.

In some embodiments, the optimizer 610 is configured to perform batch optimization at a second predetermined interval, such as, for example, every half hour, every hour, every two hours, etc. When initiating a batch optimization process, the optimizer 610 loads a current persistent delivery snapshot from the database 132e (and/or from an optimization queue) and performs an extended optimization process. For example, in some embodiments, the optimizer 610 applies a simulated annealing process to an existing persistent delivery snapshot over a predetermined number of cycles corresponding to a predetermined time period, such as, for example, one hour, two hours, etc. to provide a greater comparison of the potential solution space and identify optimal solutions. In some embodiments, a batch optimization process may generate a new persistent delivery snapshot without using the existing persistent delivery snapshot as a starting point (i.e., using only existing deliveries).

Figure 7:
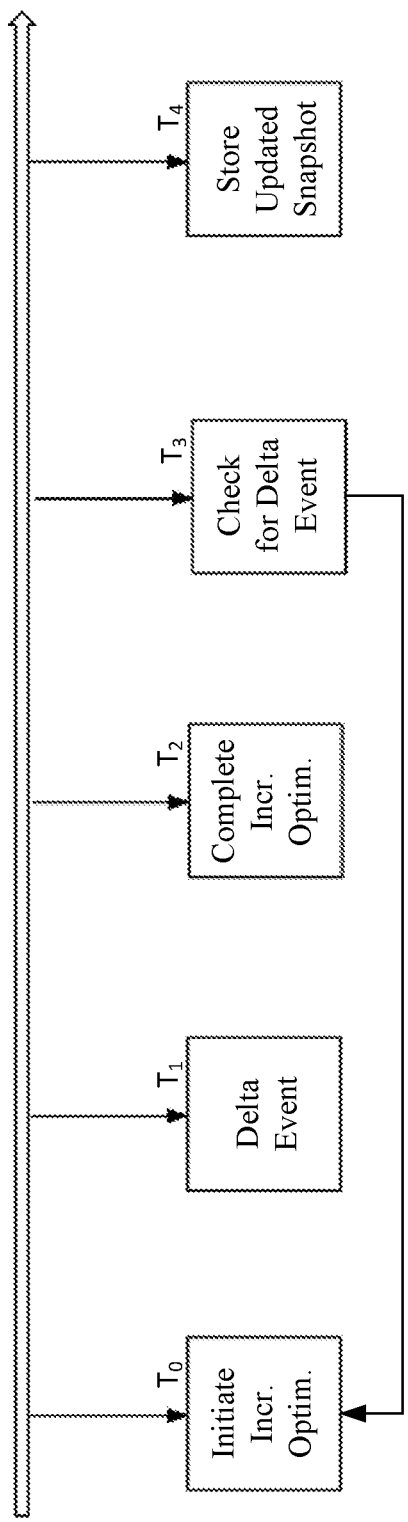
FIG. 7 illustrates an exemplary flow diagram of a method of periodic optimization, in accordance with some embodiments of the present disclosure.
Figure 8:
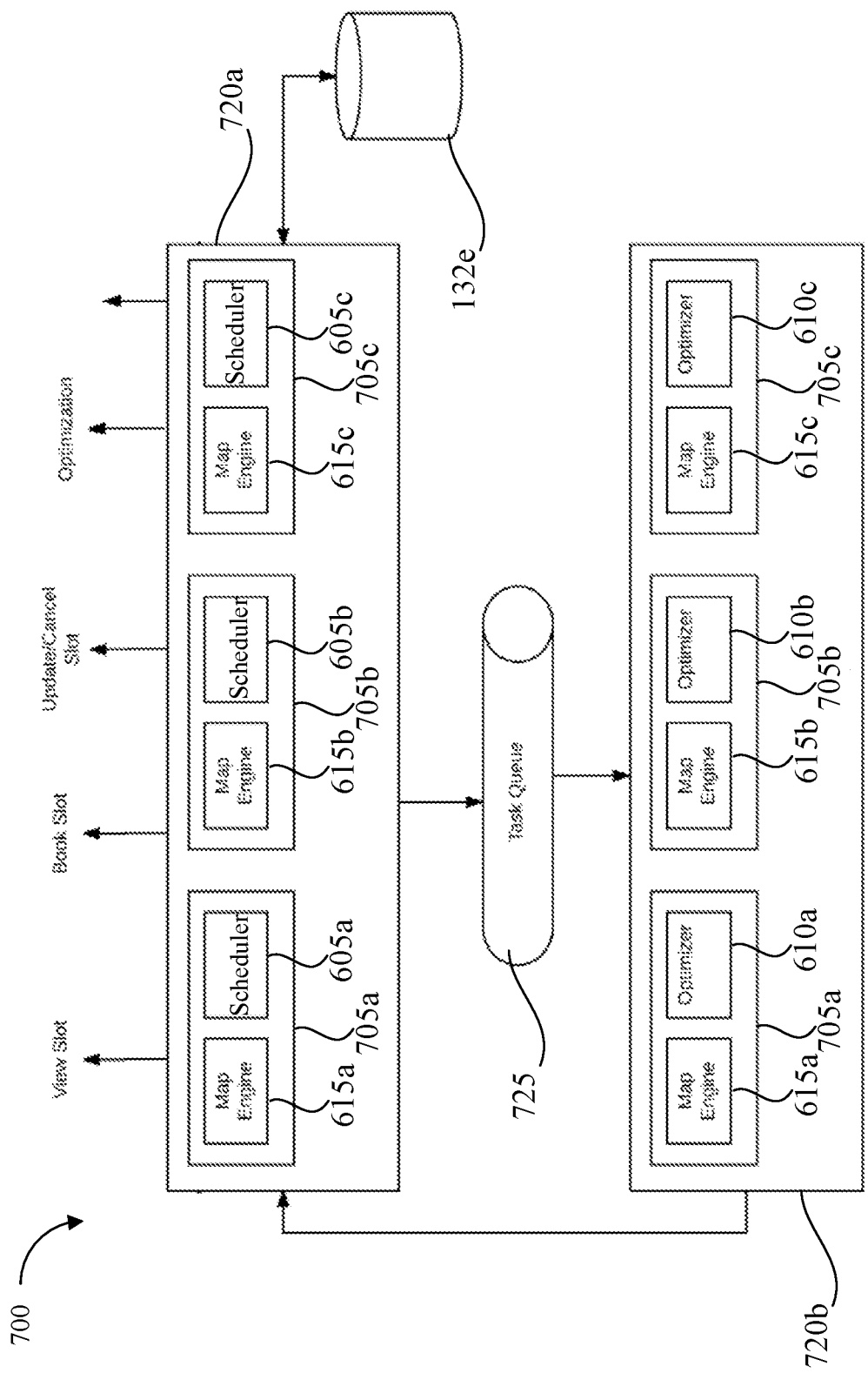
FIG. 8 illustrates an exemplary diagram of an optimization layer of the system of FIGS. 1A-1C, in accordance with some embodiments of the present disclosure.

In some embodiments, the optimizer 610 is configured to apply a reconciliation strategy during batch and/or incremental optimization, as illustrated in FIG. 7. During an optimization process, additional events (or delta events) may occur that would impact the persistent delivery snapshot.

For example, delta events can include, but are not limited to, cancellation of existing orders, updates to existing orders, and addition of new orders. As shown in FIG. 7, in some embodiments, at time to, a trigger for incremental optimization is received by a optimizer 610. As discussed below, the trigger can include any suitable trigger, such as a Backend as a Service (BaaS) trigger, an internal/external clock, and/or any other suitable trigger. The optimizer 610 initiates an incremental optimization for a persistent delivery snapshot. The incremental optimization has a predetermined run time, such as, for example, fifteen minutes. At time $t_1$, a delta event, such as an order cancellation, order modification, and/or order addition can be received at the scheduler 605. The scheduler 605 may generate a request to the optimizer 610 (and/or an optimization queue) to optimize an interim delivery snapshot based on the persistent delivery snapshot being optimized by the optimizer 610.

At time $t_2$, the optimizer 610 completes the incremental optimization and, as discussed above, generates an updated persistent delivery snapshot. At time $t_3$, prior to saving the updated persistent delivery snapshot in the database 132e, the optimizer 610 checks for delta events, such as the delta event that occurred at time $t_1$. If the optimizer 610 identifies one or more delta events, the optimizer 610 modifies the updated persistent delivery snapshot based on the delta event(s). For example, in some embodiments, the optimizer 610 incorporates the delta event(s) into the updated persistent delivery snapshot directly and/or loads the interim delivery solution from the optimization queue and discards the updated persistent delivery snapshot. After modifying the updated persistent delivery snapshot, the optimizer 610 performs an additional optimization process on the modified persistent delivery snapshot. The additional optimization process may include a cycle time that is less than, equal to, or greater than the cycle time of the incremental optimization process. After performing the additional optimization process, the optimizer 610 checks for additional delta events that occurred during the additional optimization process. If additional delta events are present, the optimizer 610 may perform a second additional optimization process. In some embodiments, the optimizer 610 includes a predetermined limit on the number of additional optimization processes that can be performed. For example, if the optimizer 610 performs three additional optimization processes and encounters additional delta events after the third optimization process, the optimizer 610 stops trying to generate an incremental update for the persistent delivery snapshot. If no additional delta events are identified, the optimizer stores the updated persistent delivery snapshot at time $t_4$.

In some embodiments, the optimization and routing block 600 includes a geospatial engine 615 configured to provide mapping data to the scheduler 605 and/or the optimizer 610. The geospatial engine 615 can include any suitable mapping engine configured to support distance and time matrix queries. In some embodiments, the geospatial engine 615 is configured to augment distance and time queries to account for modified forms of travel, such as foot travel vs. vehicle travel, on-road vs. off-road travel, etc. In some embodiments, the geospatial engine 615 is configured to pre-process map information using a predetermined process, such as a contraction hierarchy, to increase response time to queries.

In some embodiments, a server 105 can include a horizontally-scalable implementation of multiple optimization and routing blocks 600 and/or portions of multiple optimization and routing blocks 600. FIG. 8 illustrates a server environment 700 including a plurality of virtual machines 705a-705c each including an implantation of an optimization and routing block 600. The optimization and routing blocks 600 are illustrated with components in a scheduling layer 720a and an optimization layer 720b, although it will be appreciated that components can be located in any layer and/or across layers. For example, as shown in FIG. 8, each of the virtual machines 705a-705c can include a scheduler 605a-605c, an optimizer 610a-610c, and a geospatial engine 615a-615c. Although the schedulers 605a-605c and the optimizers 610a-610c are illustrated in separate layers 720a, 720b, it will be appreciated that the each of the virtual machines 705a-705c can include a single implementation of a optimization and routing block 600 containing each of scheduler 605a-605c, an optimizer 610a-610c, and a geospatial engine 615a-615c.

In some embodiments, the server environment 700 includes a scheduling layer 720a including a plurality of virtual machines 705a-705c each including a scheduler 605a-605c and a geospatial engine 615a-615c. The schedulers 605a-605c are similar to the scheduler 605 discussed above and the geospatial engines 615a-615c are similar to the geospatial engine 615 discussed above, and similar description is not repeated herein. Each of the schedulers 605a-605c is associated with and configured to receive requests to schedule a delivery for a predetermined origination location, such as a store, a warehouse, etc. The schedulers 605a-605c receive requests for deliveries from users associated with and/or located near the predetermined origination location and attempt to schedule the deliveries within an existing persistent delivery snapshot for the associated predetermined origination location, for example, from database 132e.

In some embodiments, each of the schedulers 605a-605c is configured to generate one or more calls or requests. For example, each of the schedulers 605a-605c may be configured to perform a view slot call, a book slot call, an update/cancel slot call, and/or an optimization call. For example, as discussed above with respect to FIG. 6, each of the schedulers 605a-605c are configured to view one or more available slots within a persistent delivery snapshot associated with a predetermined origination location and insert a requested delivery into an available slot (e.g., book a slot). In addition, each of the schedulers 605a-605c are configured to modify and/or remove previously scheduled deliveries. For example, in some embodiments, the schedulers 605a-605c are configured to modify a delivery time of a previously scheduled delivery, remove a previously scheduled delivery, and/or add additional deliveries.

In some embodiments, each of the schedulers 605a-605c is configured to generate an optimization call after generating in interim delivery snapshot. For example, in some embodiments, when a scheduler 605a-605c assigns a requested delivery to an available slot within a persistent delivery snapshot, the interim delivery snapshot may not contain an optimal route and/or optimal order for all deliveries and/or vehicles. The schedulers 605a-605c generate a call to an optimization layer 720b. The generated call provides the interim delivery snapshot to the optimization layer 720b, which includes a plurality of optimizers 610a-610c configured to implement an optimization process to optimize the interim delivery snapshot.

In some embodiments, each of the schedulers 605a-605c is configured to provide the interim delivery snapshot to an optimization queue 725. The optimization queue 725 is in communication with the optimization layer. When an optimizer 610a-610c is idle, the optimization queue 725 provides a pending interim delivery snapshot to the idle optimizer 610a-610c. The optimizer 610a-610c performs an optimization process to generate an updated persistent delivery snapshot. The optimizer 610a-610c may be implemented by the same virtual machine 705a-705c associated with the scheduler 605a-605c that generated the interim delivery snapshot and/or may be any available virtual machine 705a-705c selected from the available virtual machines 705a-705c.

In some embodiments, each of the virtual machines 705a-705c includes a geospatial engine 615a-615c and an optimizer 610a-610c. The geospatial engine 615a-615c may be the same geospatial engine 615a-615c used by the schedulers 605a-605c implemented by the respective virtual machine 705a-705c and/or may be an independent and/or dedicated geospatial engine 615a-615c. The optimizers 610a-610c and the geospatial engines 615a-615c are similar to the optimizer 610 and the geospatial engine 615 described above, and similar description is not repeated herein.

In some embodiments, each of the optimizers 610a-610c is configured receive an interim delivery snapshot and/or a persistent delivery snapshot and generate an updated persistent delivery snapshot. For example, in some embodiments, a scheduler 605a-605c generates an interim delivery snapshot which is provided to the optimization queue 725. When an optimizer 610a-610c is idle, the optimizer 610a-610c loads an interim delivery snapshot from the optimization queue and performs an optimization process to generate an updated persistent delivery snapshot. If no interim delivery snapshots are available in the optimization queue 725, the optimizers 610a-610c may be configured to perform an incremental and/or batch optimization. For example, persistent delivery snapshots for one or more stores are stored in a database 132e. When an optimizers 610a-610c initiates an incremental and/or batch optimization, the optimizer 610a-610c loads a persistent delivery snapshot from the database 132e and performs the incremental and/or batch optimization process to generate an updated persistent delivery snapshot that is stored in the database 132e.

In some embodiments, each of the scheduling layer 720a and the optimization layer 720b are horizontally scalable. For example, in some embodiments, if additional origination locations (such as additional stores, warehouses, etc.) are added, the scheduling layer 720a can add N additional schedulers 605c, where N is equal to the number of additional origination locations being added. Similarly, if additional origination locations are added and/or a large number of unprocessed optimization requests are located in the optimization queue 725, the optimization layer 720b can add N additional optimizers 610c, where N is the number of additional origination locations and/or the number of unprocessed optimization requests in the optimization queue 725.

In some embodiments, each of the virtual machines 705a-705c are associated with a selected one of the origination locations. For example, in some embodiments, a first scheduler 605a may be configured to receive all requests to schedule a delivery for a first origination location, a second scheduler 605b may be configured to receive all requests to schedule a delivery for a second origination location, and a third scheduler 605c may be configured to receive all requests to schedule a delivery for a third origination location. Similarly, in some embodiments, a first optimizer may be configured to handle optimization requests (including interim delivery snapshots, incremental optimization, and/or batch optimization) for delivery snapshots associated with the first origination location, a second optimizer may be configured to handle optimization requests for delivery snapshots associated with the second origination location, and a third optimizer may be configured to handle optimization requests for delivery snapshots associated with the third origination location.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system, comprising:
a communications interface configured to communicate, over one or more networks, with a vehicle server, the vehicle server being configured to communicate with a delivery computing device of each of a plurality of vehicles;
a database storing a plurality of persistent delivery snapshots of the plurality of vehicles;
a memory resource storing instructions; and
a processor operatively coupled to the communications interface, the database and memory resource, the processor being configured to execute the instructions to:
receive a request to schedule a delivery for an origination location;
generate an interim delivery snapshot including the delivery at an available time slot of a persistent delivery snapshot of the plurality of persistent delivery snapshots;
determine an overall cost associated with the interim delivery snapshot, based on a plurality of delivery parameters associated with a completion of all delivery orders by a set of vehicles identified in the interim delivery snapshot, wherein
the plurality of delivery parameters includes at least:
a total mileage driven by all assigned vehicles during delivery, a degree of lateness during delivery, and
a total vehicle number of the all assigned vehicles,
the total mileage is associated with a first weight,
the degree of lateness is associated with a second weight that is smaller than the first weight, and
the total vehicle number is associated with a third weight that is smaller than the second weight;
compute a plurality of candidate overall costs using a meta-heuristic algorithm based on: the interim delivery snapshot, the plurality of delivery parameters, and the weights associated with the plurality of delivery parameters, wherein each of the plurality of candidate overall costs is associated with a set of candidate delivery routes of the set of vehicles, wherein each of the plurality of candidate overall costs is computed iteratively after re-assigning at least one delivery order from one vehicle to another vehicle among the set of vehicles;
compare the determined overall cost with the plurality of candidate overall costs to determine a minimum overall cost based on the plurality of delivery parameters comprising the total mileage driven by all assigned vehicles during delivery, the degree of lateness during delivery, the total vehicle number of the all assigned vehicles, after the re-assigning, and the associated weights of the plurality of delivery parameters;
based on the minimum overall cost, determine, for each of the set of vehicles, an optimized delivery route, the optimized delivery route being associated with one or more optimized delivery orders of all the delivery orders identified in the interim delivery snapshot that are assigned to a corresponding vehicle of the set of vehicles corresponding to the minimum overall cost;

based at least on the determined optimized delivery route for each of the set of vehicles and the interim delivery snapshot, generate an updated persistent delivery snapshot; and for each of the set of vehicles, transmit, over the one or more networks, via the vehicle server and to a corresponding delivery computing device, the optimized delivery route.

2. The system of claim 1, wherein the processor is further configured to execute the instructions to:

store the updated persistent delivery snapshot in the database.

3. The system of claim 2, wherein the processor is further configured to execute the instructions to:

provide the interim delivery snapshot to an optimization queue, wherein the interim delivery snapshot is received from the optimization queue before computing the plurality of candidate overall costs.

4. The system of claim 3, wherein the processor is further configured to execute the instructions to:

apply an incremental optimization process to the updated persistent delivery snapshot.

5. The system of claim 3, wherein the processor is further configured to execute the instructions to:

apply a batch optimization process to the updated persistent delivery snapshot.

6. The system of claim 1, wherein the processor is further configured to execute the instructions to:

receive at least one delta event; and modify the updated persistent delivery snapshot based on the at least one delta event.

7. The system of claim 1, wherein the processor is further configured to execute the instructions to implement a set of geospatial operations, the set of geospatial operations including:

receiving distance and time matrix queries; and generating mapping data.

8. The system of claim 7, wherein the set of geospatial operations provides distance and time queries for off-road travel.

9. A method, implemented on a processor operatively coupled to a database and a memory resource, comprising:

receiving a request to schedule a delivery for an origination location, wherein:

the processor is operatively coupled to a communications interface, the communications interface is configured to communicate, over one or more networks, with a vehicle server, the vehicle server being configured to communicate with a delivery computing device of each of a plurality of vehicles, the database stores a plurality of persistent delivery snapshots of the plurality of vehicles;

generating an interim delivery snapshot including the delivery at an available time slot of a persistent delivery snapshot of the plurality of persistent delivery snapshots;

determining an overall cost associated with the interim delivery snapshot, based on a plurality of delivery parameters associated with a completion of all delivery orders by a set of vehicles identified in the interim delivery snapshot, wherein the plurality of delivery parameters includes at least: a total mileage driven by all assigned vehicles during delivery, a degree of lateness during delivery, and a total vehicle number of the all assigned vehicles, the total mileage is associated with a first weight, the degree of lateness is associated with a second weight that is smaller than the first weight, and the total vehicle number is associated with a third weight that is smaller than the second weight;

computing a plurality of candidate overall costs using a meta-heuristic algorithm based on: the interim delivery snapshot, the plurality of delivery parameters, and the weights associated with the plurality of delivery parameters, wherein each of the plurality of candidate overall costs is associated with a set of candidate delivery routes of the set of vehicles, wherein each of the plurality of candidate overall costs is computed iteratively after re-assigning at least one delivery order from one vehicle to another vehicle among the set of vehicles;

comparing the determined overall cost with the plurality of candidate overall costs to determine a minimum overall cost based on the plurality of delivery parameters comprising the total mileage driven by all assigned vehicles during delivery, the degree of lateness during delivery, the total vehicle number of the all assigned vehicles, after the re-assigning, and the associated weights of the plurality of delivery parameters;

based on the minimum overall cost, determining, for each of the set of vehicles, an optimized delivery route, the optimized delivery route being associated with one or more optimized delivery orders of all the delivery orders identified in the interim delivery snapshot that are assigned to a corresponding vehicle of the set of vehicles corresponding to the minimum overall cost;

based at least on the determined optimized delivery route for each of the set of vehicles and the interim delivery snapshot, generate an updated persistent delivery snapshot; and for each of the set of vehicles, transmitting, over the one or more networks, via the vehicle server and to a corresponding delivery computing device, the optimized delivery route.

10. The method of claim 9, further comprising:

storing the updated persistent delivery snapshot in the database.

11. The method of claim 10, further comprising:

providing the interim delivery snapshot to an optimization queue, wherein the interim delivery snapshot is received from the optimization queue before computing the plurality of candidate overall costs.

12. The method of claim 11, further comprising applying an incremental optimization process to the updated persistent delivery snapshot.

13. The method of claim 11, further comprising applying a batch optimization process to the updated persistent delivery snapshot.

14. The method of claim 9, further comprising:

receiving at least one delta event; and modifying the updated persistent delivery snapshot based on the at least one delta event.

15. The method of claim 9, further comprising implementing a set of geospatial operations, the set of geospatial operations including receiving distance and time matrix queries and generating mapping data.

16. A non-transitory computer readable medium having instructions stored thereon, wherein the instructions, when executed by a processor, cause a device to perform operations comprising:

receiving a request to schedule a delivery for an origination location, wherein:
  the processor is operatively coupled to a communications interface and a database,
  the communications interface is configured to communicate, over one or more networks, with a vehicle server, the vehicle server being configured to communicate with a delivery computing device of each of a plurality of vehicles,
  the database stores a plurality of persistent delivery snapshots of the plurality of vehicles;
generating an interim delivery snapshot including the delivery at an available time slot of a persistent delivery snapshot of the plurality of persistent delivery snapshots;
determining an overall cost associated with the interim delivery snapshot, based on a plurality of delivery parameters associated with a completion of all delivery orders by a set of vehicles identified in the interim delivery snapshot, wherein
  the plurality of delivery parameters includes at least: a total mileage driven by all assigned vehicles during delivery, a degree of lateness during delivery, and a total vehicle number of the all assigned vehicles,
  the total mileage is associated with a first weight,
  the degree of lateness is associated with a second weight that is smaller than the first weight, and
  the total vehicle number is associated with a third weight that is smaller than the second weight;
computing a plurality of candidate overall costs using a meta-heuristic algorithm based on: the interim delivery snapshot, the plurality of delivery parameters, and the weights associated with the plurality of delivery parameters, wherein each of the plurality of candidate overall costs is associated with a set of candidate delivery routes of the set of vehicles, wherein each of the plurality of candidate overall costs is computed iteratively after re-assigning at least one delivery order from one vehicle to another vehicle among the set of vehicles;
comparing the determined overall cost with the plurality of candidate overall costs to determine a minimum overall cost based on the plurality of delivery parameters comprising the total mileage driven by all assigned vehicles during delivery, the degree of lateness during delivery, the total vehicle number of the all assigned vehicles, after the re-assigning, and the associated weights of the plurality of delivery parameters;
based on the minimum overall cost, determining, for each of the set of vehicles, an optimized delivery route, the optimized delivery route being associated with one or more optimized delivery orders of all the delivery orders identified in the interim delivery snapshot that are assigned to a corresponding vehicle of the set of vehicles corresponding to the minimum overall cost;
based at least on the determined optimized delivery route for each of the set of vehicles and the interim delivery snapshot, generate an updated persistent delivery snapshot; and
for each of the set of vehicles, transmitting, over the one or more networks, via the vehicle server and to a corresponding delivery computing device, the optimized delivery route.

17. The non-transitory computer readable medium of claim 16, wherein the instructions, when executed by the processor, further cause the device to perform operations comprising:
  receiving at least one delta event; and
  modifying the updated persistent delivery snapshot based on the at least one delta event.

* * * * *